(12) United States Patent
Wenger et al.

(10) Patent No.: US 10,583,998 B2
(45) Date of Patent: Mar. 10, 2020

(54) EGG TRAY STACKING MACHINE

(71) Applicants: Dean A. Wenger, Mount Joy, PA (US); Darwin H. Metzler, Lititz, PA (US)

(72) Inventors: Dean A. Wenger, Mount Joy, PA (US); Darwin H. Metzler, Lititz, PA (US)

( * ) Notice: Subject to any disclaimer, the term of this patent is extended or adjusted under 35 U.S.C. 154(b) by 27 days.

(21) Appl. No.: 15/909,033

(22) Filed: Mar. 1, 2018

(65) Prior Publication Data

US 2018/0251320 A1   Sep. 6, 2018

Related U.S. Application Data

(60) Provisional application No. 62/600,940, filed on Mar. 4, 2017.

(51) Int. Cl.
*B65G 47/244* (2006.01)
*B65G 57/30* (2006.01)

(52) U.S. Cl.
CPC ......... *B65G 47/244* (2013.01); *B65G 57/303* (2013.01); *B65G 2201/0208* (2013.01); *B65G 2811/0626* (2013.01)

(58) Field of Classification Search
CPC .............. B65G 47/244; B65G 57/081; B65G 2811/0626; B65G 47/5181; B65G 57/303; B65G 57/32; B65G 59/063; B65B 35/50; B65H 29/38

See application file for complete search history.

(56) References Cited

U.S. PATENT DOCUMENTS

| | | | | |
|---|---|---|---|---|
| 3,506,109 A | * | 4/1970 | Braas | B65G 57/303 198/418.4 |
| 3,509,995 A | | 5/1970 | Colaw | |
| 3,517,482 A | * | 6/1970 | Beninger | B65B 51/12 414/788.8 |
| 3,576,255 A | * | 4/1971 | Warren | B65B 35/50 209/572 |
| 3,763,625 A | | 10/1973 | Slavin | |
| 3,792,784 A | | 2/1974 | Mosterd | |
| 4,043,460 A | * | 8/1977 | Steele | B65G 57/303 414/795.2 |
| 4,063,632 A | * | 12/1977 | Neth | B65G 47/244 198/374 |
| 4,765,487 A | | 8/1988 | Bliss | |
| 4,997,339 A | | 3/1991 | Antonis | |

(Continued)

*Primary Examiner* — Gregory W Adams
(74) *Attorney, Agent, or Firm* — Miller Law Group, PLLC

(57) ABSTRACT

An automatic egg tray stacking apparatus turns alternate egg trays through the operation of movable guides at the junction with a loading conveyor before conveying the egg trays toward a stacking mechanism that first stops the egg tray and then lowers the stack on top of the egg tray before re-elevating the partially formed stack to permit the entrance of a new egg tray into the stacking mechanism. Once the stack of egg trays is completed, the stack is allowed to move onto a stack conveyor and is moved forwardly for shipment. The stacking mechanism is operated by a single actuator having dual pneumatic cylinders that provide a three position operation of the lifting function with the stacking mechanism having lifter members engaging all four sides of the lower-most egg tray of the elevated stack. A control mechanism operates the apparatus with input from appropriately positioned sensors.

13 Claims, 15 Drawing Sheets

(56) References Cited

U.S. PATENT DOCUMENTS

| | | | | |
|---|---|---|---|---|
| 5,375,692 A | * | 12/1994 | Staudinger | B65H 29/22 |
| | | | | 198/461.2 |
| 6,155,153 A | * | 12/2000 | Davison | B65G 57/14 |
| | | | | 414/792.2 |
| 7,500,819 B2 | * | 3/2009 | Nielsen | B65G 57/035 |
| | | | | 198/468.8 |
| 8,342,313 B2 | * | 1/2013 | Wargo | B65G 47/29 |
| | | | | 198/419.1 |

* cited by examiner

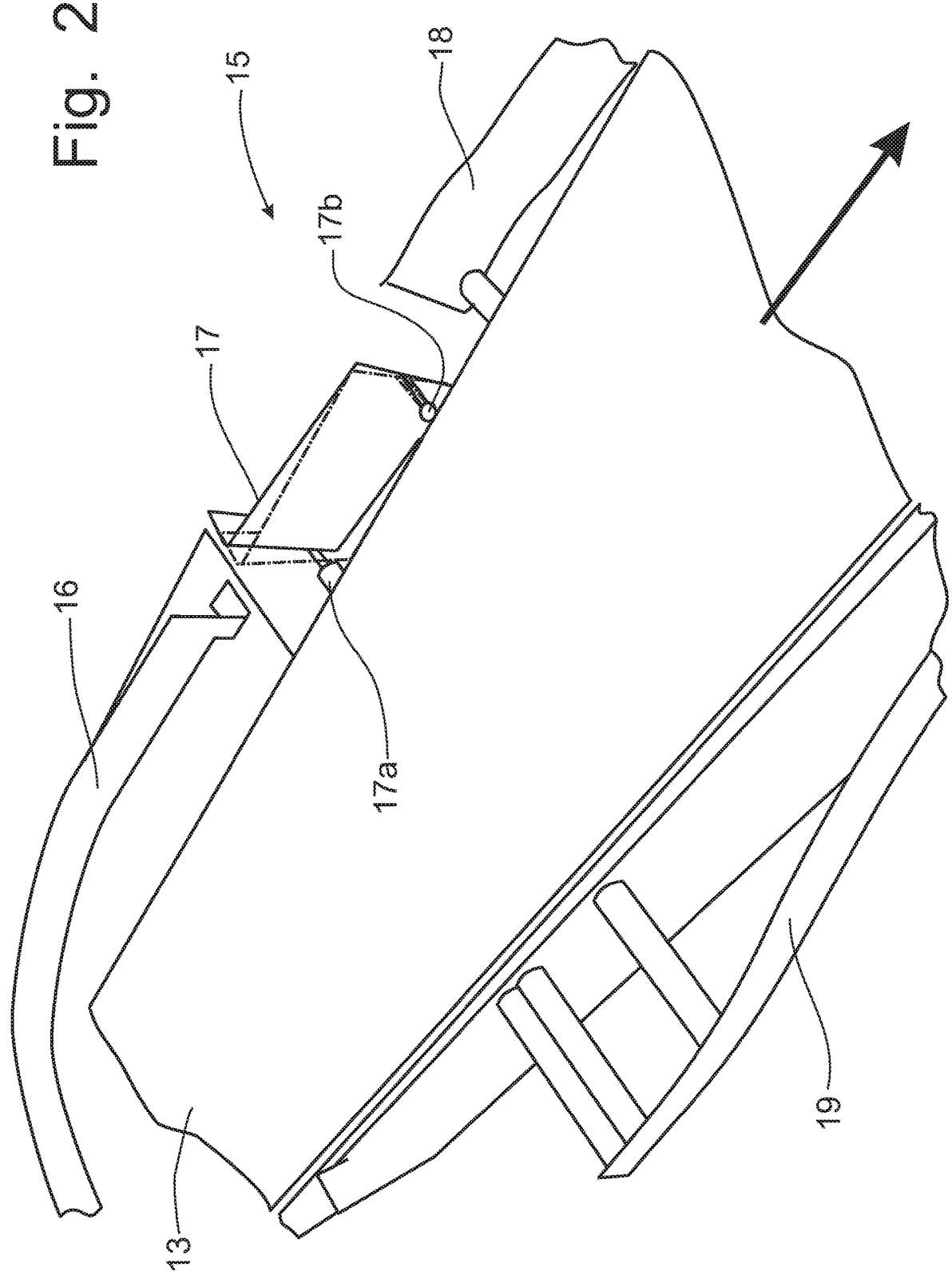

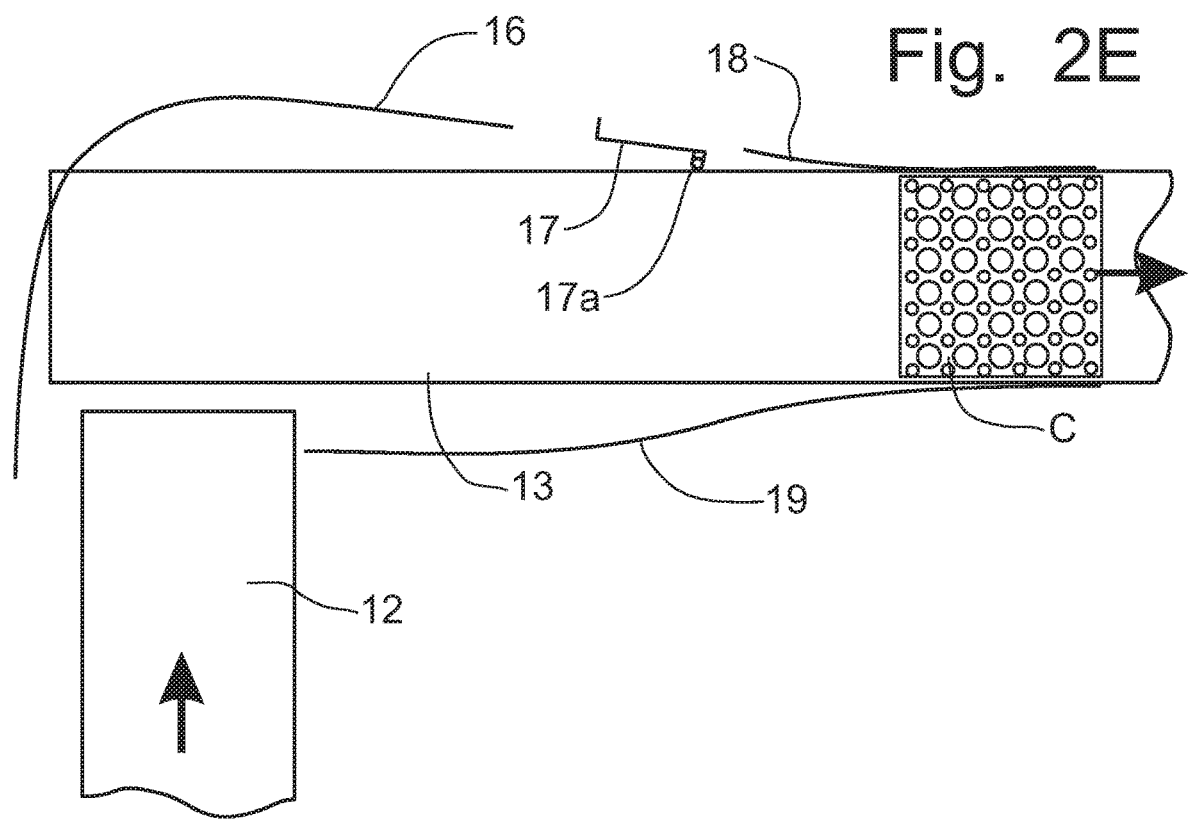
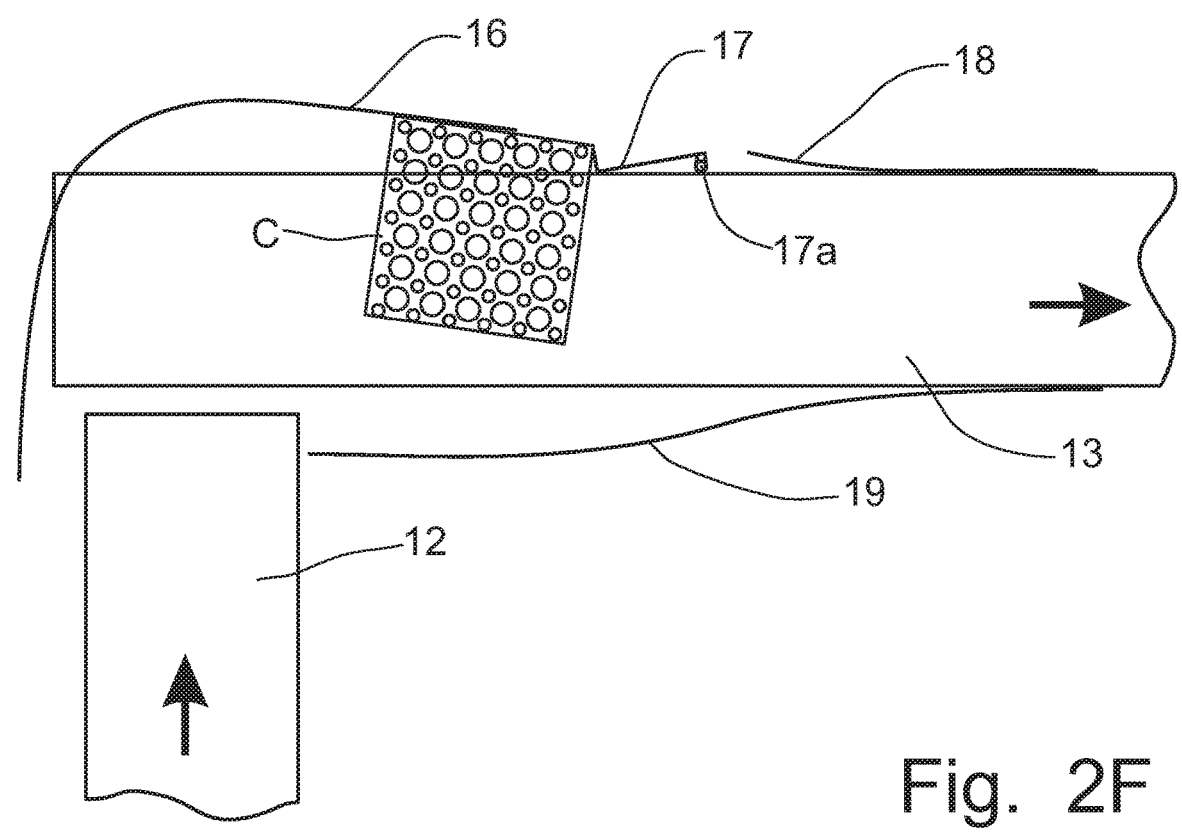

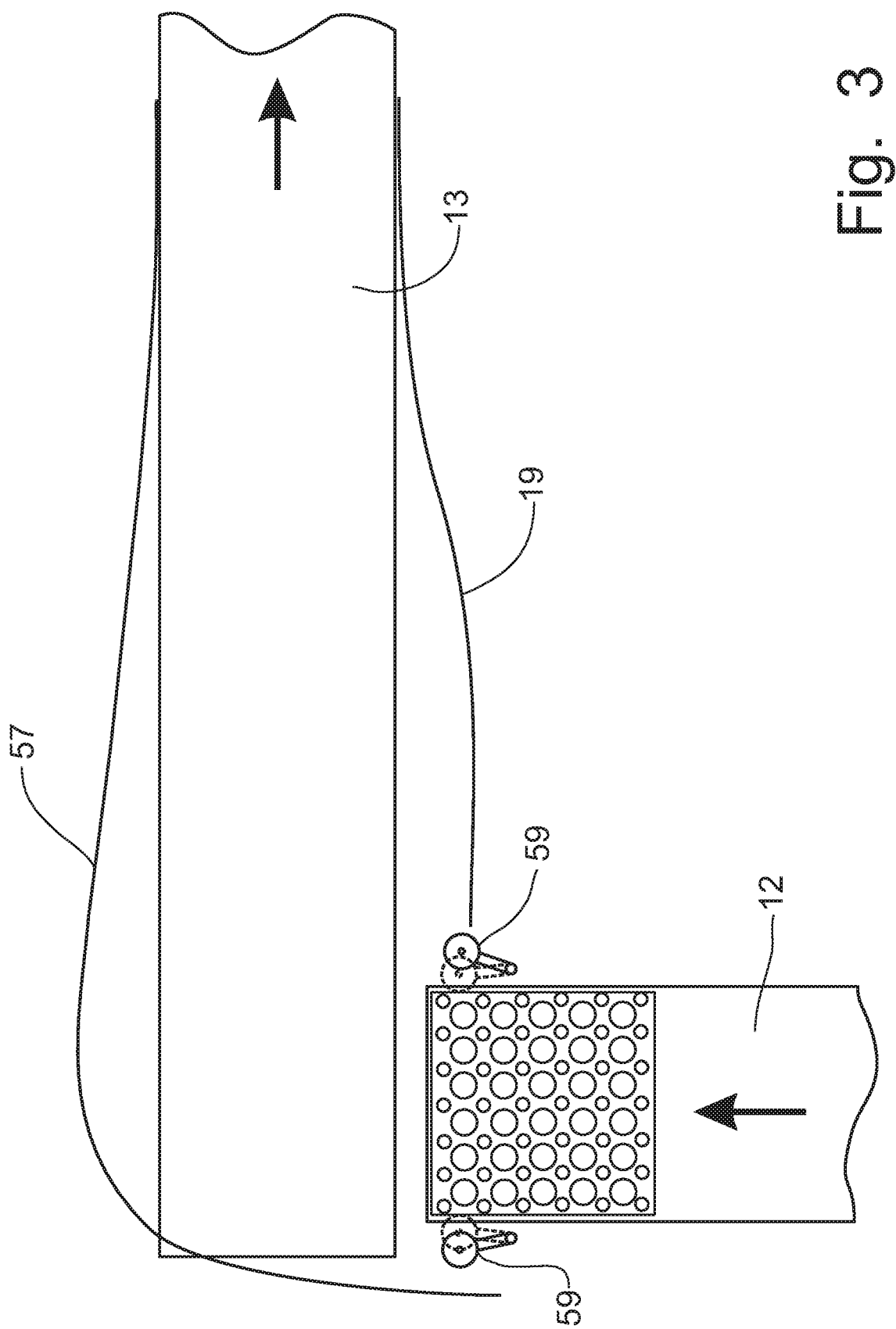

EGG TRAY STACKING MACHINE

CROSS-REFERENCE TO RELATED APPLICATIONS

This application claims domestic priority on U.S. Provisional Patent Application Ser. No. 62/600,940, filed on Mar. 4, 2017, the content of which is incorporated herein by reference.

FIELD OF THE INVENTION

This invention relates generally to a machine for stacking trays or flats filled with eggs and, more particularly, to an automatic egg tray stacking machine that orients alternating egg trays in an orientation that is rotated ninety degrees to adjacent egg trays before placing the egg trays into a stack for transportation thereof, and an egg tray stacking machine that supports the egg tray from all four sides when elevating the partially formed stack of egg trays vertically above the conveyor.

BACKGROUND OF THE INVENTION

In the processing and packaging of eggs, the eggs are collected from the chickens and moved to a processing area where the eggs are properly oriented and deposited into trays, also known as flats, formed in a convoluted manner from molded pulp or, more recently, from molded plastic, to create pockets for holding individual eggs. Each egg tray typically contains thirty eggs, arranged in five rows of six eggs in each row. When the egg trays are oriented such that the eggs are arranged in six rows with five eggs in each row, the egg trays will stack vertically with the individual eggs in the pockets in the first tray being aligned with convoluted pockets on the underside of the next vertically positioned tray which is oriented 90 degrees to the adjacent egg tray. As a result, the eggs are not vertically aligned from one egg tray to the next vertically positioned egg tray in the stack of egg trays.

The processing and packaging of eggs has become highly automated over recent years, with many functions which were accomplished manually now being performed either completely or partially automatically by machinery. With the influx of automated machinery comes a high speed of operation, particularly with respect to various processing steps including, washing, grading and packaging of the eggs into individual egg trays.

Stacking egg trays for shipment requires that the alternate egg trays be oriented at a ninety degree rotation relative to the egg trays immediately above and/or below within the stack. As a result, the packing of egg trays for shipment has traditionally been a manual operation even though much of the processing and placement of the eggs into the trays is accomplished by automated machinery. Some effort, however, has been made to provide automated machinery for stacking egg trays for shipment.

In U.S. Pat. No. 3,509,995, granted on May 5, 1970, to Marvin E. Colaw, a machine for stacking reusable egg trays is disclosed in which the eggs have been removed from the egg trays and the egg trays not soiled by broken egg remains are collected and stacked in a vertical manner. Soiled trays are identified by a sensor and allowed to pass along the conveyor for discharge off the end rather than be added to the stack. The teachings of this reference do not appear to include a mechanism for rotating the egg trays so that after having the eggs removed the egg trays will have the same orientation to stack properly.

In U.S. Pat. No. 3,763,625, granted to Rudy Slavin, et al, on Oct. 9, 1973, a machine is disclosed for the placement of eggs into the egg trays and then moving the filled egg trays into a stack for shipment. The Slavin machine incorporates a complex egg tray accumulating mechanism that affects a rotation of alternate egg trays by a platform in which the orientation is controlled by a cam mechanism that is alternated by a toggle device. The egg trays after being oriented properly are raised by the platform into an elevated stack held by four pivoted dog devices that are mounted on an elevated frame. After a proper number of egg trays have been accumulated in the elevated stack, the stack is lowered onto the conveyor and moved to a position to be removed for shipment.

A mechanism for handling egg trays is disclosed in U.S. Pat. No. 3,792,784, granted on Feb. 19, 1974, to Jacob H. Mosterd. The apparatus for handling the egg trays is primarily a gripping mechanism that is mounted on a four-bar linkage that is operable to move individual egg trays laterally from one conveyor to a second conveyor. By operation of this mounted gripping mechanism, a stack of egg trays can be disassembled one tray at a time by the gripping mechanism engaging an egg tray from the stack an placing the egg tray on the second conveyor, while a elevating support ratchets upwardly to position the next tray in the stack for engagement thereof by the gripping mechanism. This elevating support is also rotatable through 90 degrees to re-orient the uppermost tray on the stack as desired for transfer to the second conveyor.

In a similar manner, the Mosterd gripping mechanism can be used to create a stack of egg trays having alternating orientations. The gripping mechanism can engage a single egg tray on the second conveyor and move the gripped egg tray laterally to position the egg tray on the elevated support. The elevated support can then ratchet down a prescribed distance to accommodate the next egg tray, while also rotating through 90 degrees so that the subsequent egg tray placed onto the egg tray previously placed on the elevated support is oriented in a rotated position relative to the egg tray beneath it. With the next egg tray moved by the gripping mechanism from the second conveyor to the elevated support, the elevated support is ratcheted down another prescribed distance and rotated back 90 degrees to the original position. In this manner, a stack of egg trays with alternating orientations can be created.

U.S. Pat. No. 4,765,487, granted on Aug. 23, 1988, to George Bliss, discloses an apparatus for stacking articles, including egg cartons and egg trays. Egg cartons are containers holding a dozen eggs in a corrugated tray with a lid that folds over to capture the eggs internally. Such egg cartons are typically how eggs are sold to consumers commercially. The Bliss apparatus accumulates three egg cartons on a single layer and then alternates the orientation of succeeding layers of egg cartons until the stack of egg cartons is completed. The alternating orientation of the layers of egg cartons is accomplished through a rotating table on which the egg cartons are accumulated into a layer and then rotated 90 degrees relative to the previous layer before being elevated into a stack. This same mechanism can also form a stack of standard egg trays, as is disclosed in the Bliss reference. The stack of egg trays is held in an elevated position by four hinged layer holders that are positioned to engage the peripheral underside of the egg tray.

A different configuration of an apparatus for forming a stack of alternating egg trays is found in U.S. Pat. No. 4,997,339, granted to Matheus Antonis on Mar. 5, 1991, in which the egg trays are oriented by a rotating table on which the incoming egg trays are position. A cam mechanism operates the rotation of the rotating table between orientations that are 90 degrees of rotation apart. Once the egg tray has been properly oriented, an elevator provided with opposing fingers that engage the peripheral underside of the egg tray and elevate the egg tray while moving the egg tray longitudinally to place the egg tray into a stack formation. The opposing fingers pivot to pass over any accumulated egg trays in the stack before moving around the circular path to engage a subsequent egg tray.

Similarly, the apparatus disclosed in U.S. Pat. No. 6,155,153, granted to Stephen Davison on Dec. 5, 2000, is designed to create a stack of egg cartons in which alternating layers are oriented at a 90 degree rotation relative to the adjacent layers of egg cartons. As with the preceding devices described above, the orientation of the layer of egg cartons is affected by a rotating table. The Davison apparatus is also operate to form a stack of egg trays by rotating the alternating egg tray on the rotating table before being placed on top of the formed stack of egg trays.

The provision of rotating tables to affect the alternating orientation of the egg trays placed into a stack for shipment creates design problems as the table requires room to operate from beneath the egg tray to provide the structure for operatively rotating the table. Furthermore, high speeds of operation associated with mechanized handling of eggs require a more effective manner, other than a rotating table or manually turning the egg trays to create the stack of egg trays ready for shipment to a processor. Accordingly, it would be desirable to provide a machine for stacking filled egg trays in alternating orientations that does not utilize a rotating table in the orienting of the alternating egg trays. It is also desirable to provide an automatic egg tray stacking machine that will support the partially formed stack of egg trays with a lifter mechanism that engages all four sides of the lowermost egg tray in the partially formed stack.

SUMMARY OF THE INVENTION

It is an object of this invention to overcome the disadvantages of the prior art by providing an automatic egg tray stacking mechanism that does not require the use of a rotating table for orienting the egg trays before being placed into a stack for shipment.

It is another object of this invention to provide a mechanism that is effectively operable to mate with high speed operations of egg processing machines.

It is a feature of this invention that the desired orientation of an egg tray can be accomplished by controlling the movement of the egg tray as the egg tray moves from a loading conveyor to a perpendicularly oriented conveyor.

It is an advantage of this invention that the control of the orientation of the egg trays can be accomplished by movable guides.

It is another advantage of this invention that the control of the orientation of the egg trays can be accomplished by a pair of opposing pinch rollers engaging the sides of the egg tray to speed the movement of the egg tray onto the second conveyor.

It is another feature of this invention that the stacking mechanism is operated by a single actuator having dual pneumatic cylinders to move the stacking mechanism in creating the stack of egg trays.

It is still another advantage of this invention that the pneumatic cylinders in the actuator are connected in series and are each operable between two positions of contraction or extension to establish three operating positions of the stacking mechanism.

It is still another feature of this invention that the stacking mechanism has a stop function and a lifting function that can be actuated with a single pneumatic actuator mechanism.

It is yet another advantage of this invention that the stack of egg trays is never turned as the individual egg trays are properly oriented before being placed into the stack.

It is yet another feature of this invention that the lifting function of the stacking mechanism requires a minimal distance in which the stack is moved before a subsequent egg tray is placed into position to be lifted into the stack.

It is still another advantage of this invention that the speed of movement of the stacking mechanism conforms to high speed egg processing operations.

It is still another object of this invention to provide a stack lifting mechanism that engages all four sides of the lowermost egg tray in a partially formed stack of egg trays to elevate the partially formed stack above a conveyor surface.

It is still another feature of this invention that the stack of egg trays is supported in an elevated position by pivoted supports that engage the peripheral underside of all four sides of the lowermost egg tray.

It is a further feature of this invention that the stop function is incorporated into the egg tray lift mechanism to cause the incoming egg tray to stop forward movement at the proper position for being lifted into the stack.

It is a further advantage of this invention that the cycling of the egg tray lift mechanism lowers the partially formed stack onto the top of the incoming egg tray before lifting the incoming egg tray into the position of the lowermost egg tray in the stack.

It is still a further feature of this invention that any waiting incoming egg tray is stopped on the conveyor by a supplemental stop member until the stack has been re-elevated.

It is still another advantage of this invention that the lifting mechanism includes a rear lifter member that is formed with a window to permit passage of an egg tray beneath the supplemental stop into a proper position while the stacking mechanism maintains the partially formed stack of egg trays in a vertically elevated position.

It is yet another feature of this invention that the control mechanism incorporates a bypass switch that enables the conveyors to continue moving, but disengages operation of the stacking mechanism.

It is yet another advantage of this invention that the use of the bypass switch allows the egg trays to be stacked manually until repairs can be made.

It is yet another object of this invention to provide an automatic egg stacking apparatus that creates a stack of egg trays for shipment, the stacking apparatus being durable in construction, inexpensive of manufacture, carefree of maintenance, facile in assemblage, and simple and effective in use.

These and other objects, features and advantages are accomplished according to the instant invention by providing an automatic egg tray stacking apparatus that turns alternate egg trays through the operation of movable guides at the junction with a loading conveyor before conveying the egg trays toward a stacking mechanism that first stops the egg tray and then lowers the stack on top of the egg tray before re-elevating the partially formed stack to permit the entrance of a new egg tray into the stacking mechanism. Once the stack of egg trays is completed, the stack is allowed to move onto a stack conveyor and is moved forwardly for shipment. The stacking mechanism is operated by a single actuator having dual pneumatic cylinders that provide a three position operation of the lifting function with the stacking mechanism having lifter members engaging all four sides of the lowermost egg tray of the elevated stack. A control mechanism operates the apparatus with input from appropriately positioned sensors.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a schematic partial view of the first conveyor and guide members utilized to orient alternating egg trays delivered from the loading conveyor, the movement of the pivoted blocker guide member being shown in phantom;

FIGS. 2A-2E are plan view, operational diagrams depicting the sequential movement of an egg tray to present the six egg side of the egg tray as the leading edge presented to the stacking mechanism;

FIGS. 2F-2H are plan view, operational diagrams depicting the sequential movement of an egg tray to present the five egg side of the egg tray as the leading edge presented to the stacking mechanism;

FIG. 3 is a schematic plan view of an alternative mechanism for turning alternate egg trays for presentation to the stacking mechanism, the movement of the pinch rollers being shown in phantom;

DETAILED DESCRIPTION OF THE PREFERRED EMBODIMENT

Figure 1:
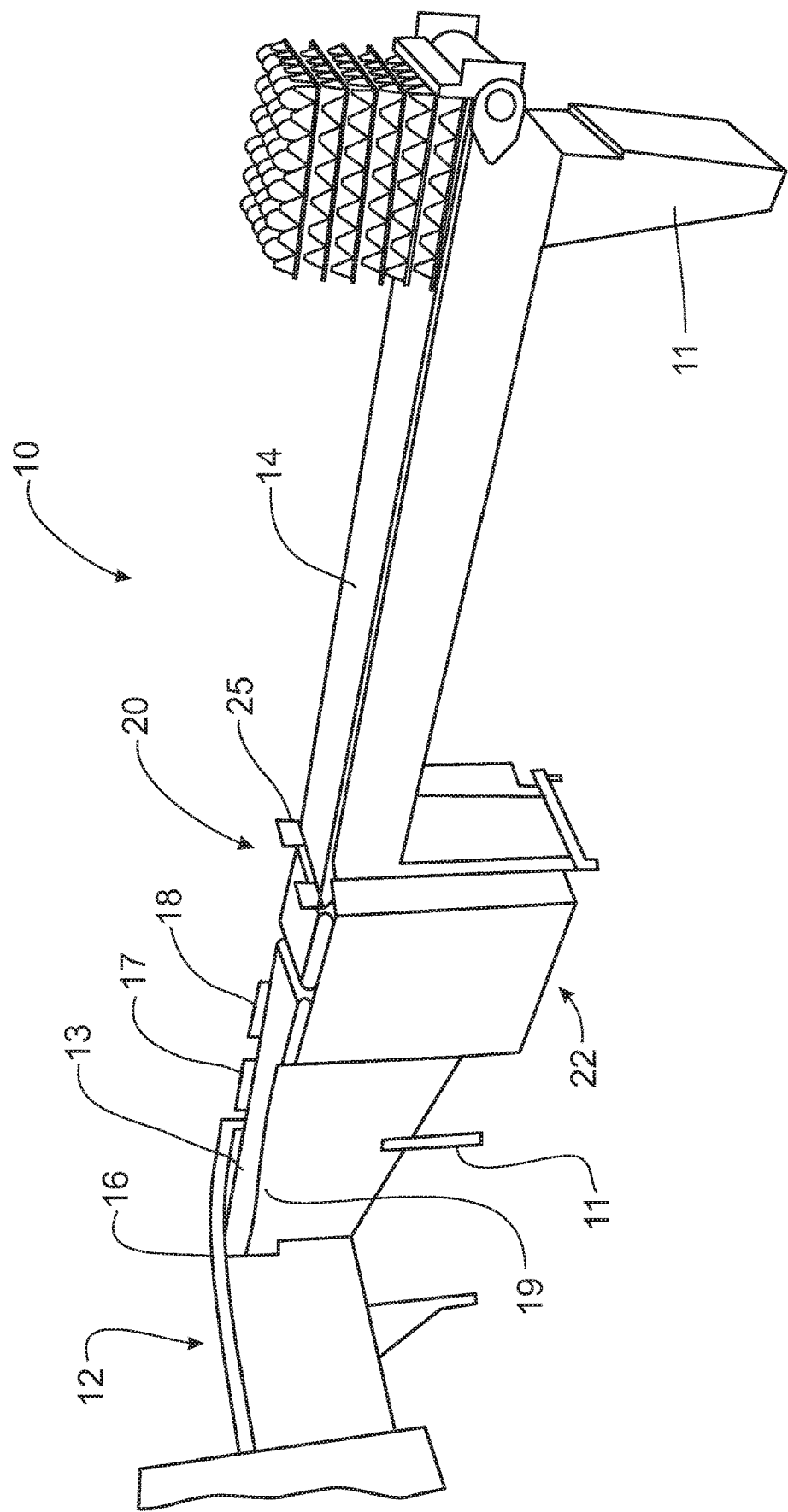
FIG. 1 is a schematic perspective view of the right side of the automatic egg tray stacking mechanism incorporating the principles of the instant invention, a completed stack of egg trays being positioned at the end of the stack conveyor.

Referring now to the drawings, an automatic egg tray stacking apparatus incorporating the principles of the instant invention can best be seen. The automatic egg tray stacking apparatus 10 is supported on a frame 11 to receive loaded egg trays, i.e. egg trays filled, or at least partially filled, with eggs, from a loading conveyor 12 prior to which an egg loading mechanism (not shown) can be utilized to load eggs into the respective egg trays. Egg trays are normally formed with five rows of six eggs in each row. Therefore, egg trays have a six row side and a five row side. The egg trays are formed with upwardly projecting pins that engage sockets formed in the underside of the egg trays to form an interlocking configuration, but only when the egg trays are stacked in alternating orientations. Thus, the first order of business for the automatic egg stacking apparatus 10 is to affect alternating orientation of the egg trays with the six egg side being the leading edge on alternating egg trays and the five egg side being the leading edge on the egg trays therebetween.

Figure 2A:
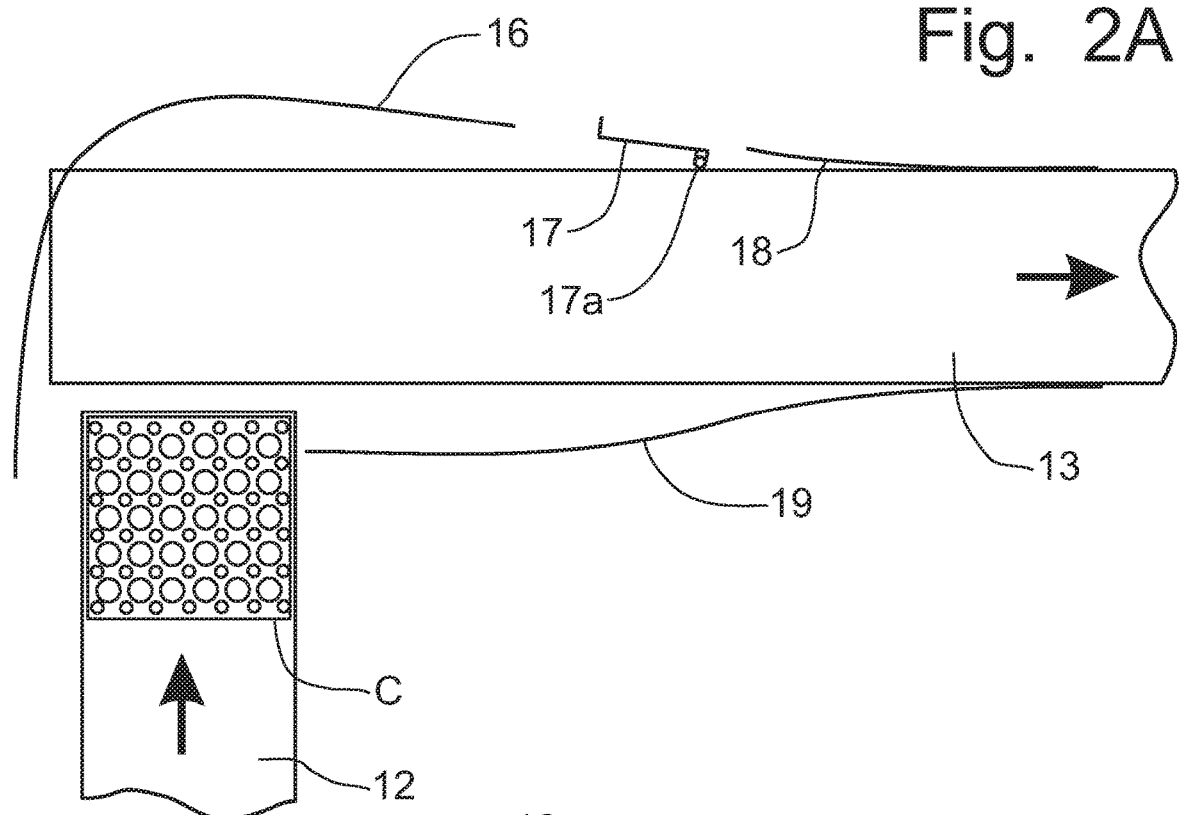
Figure 2B:
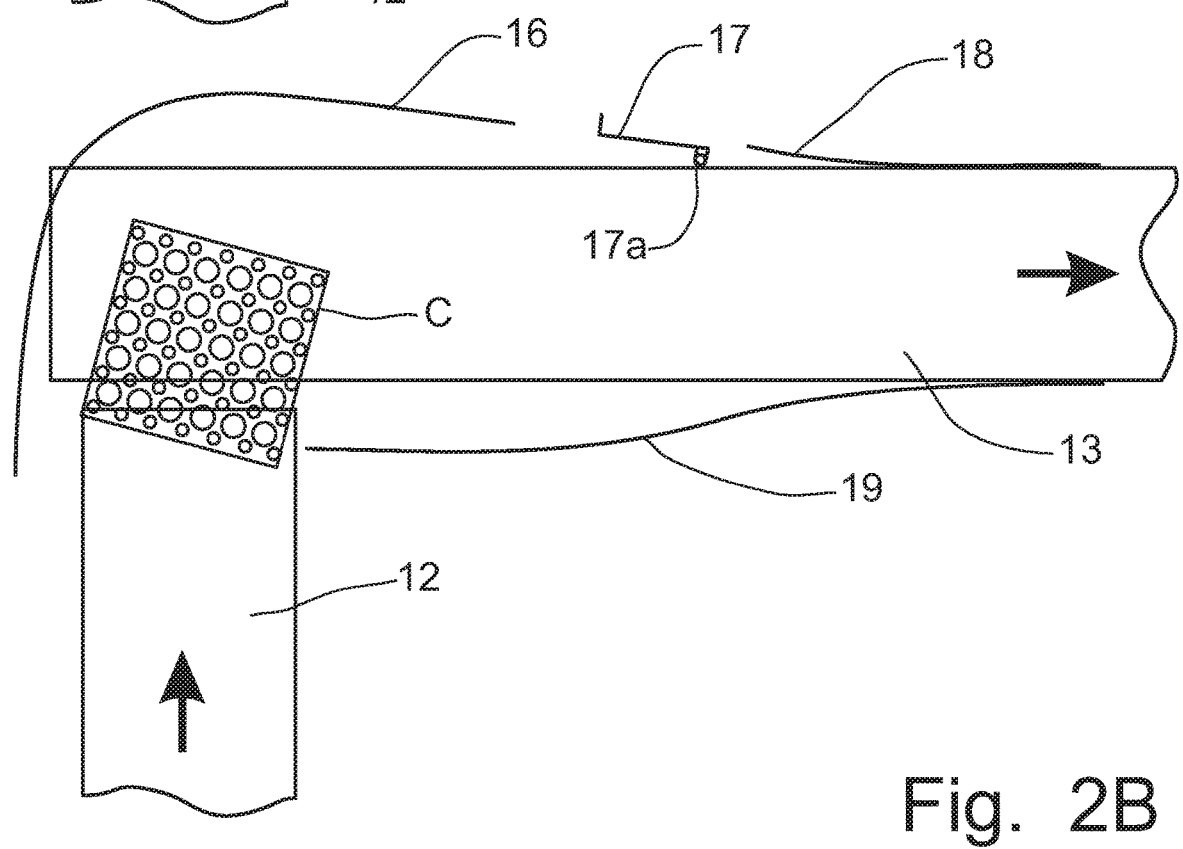
Figure 2C:
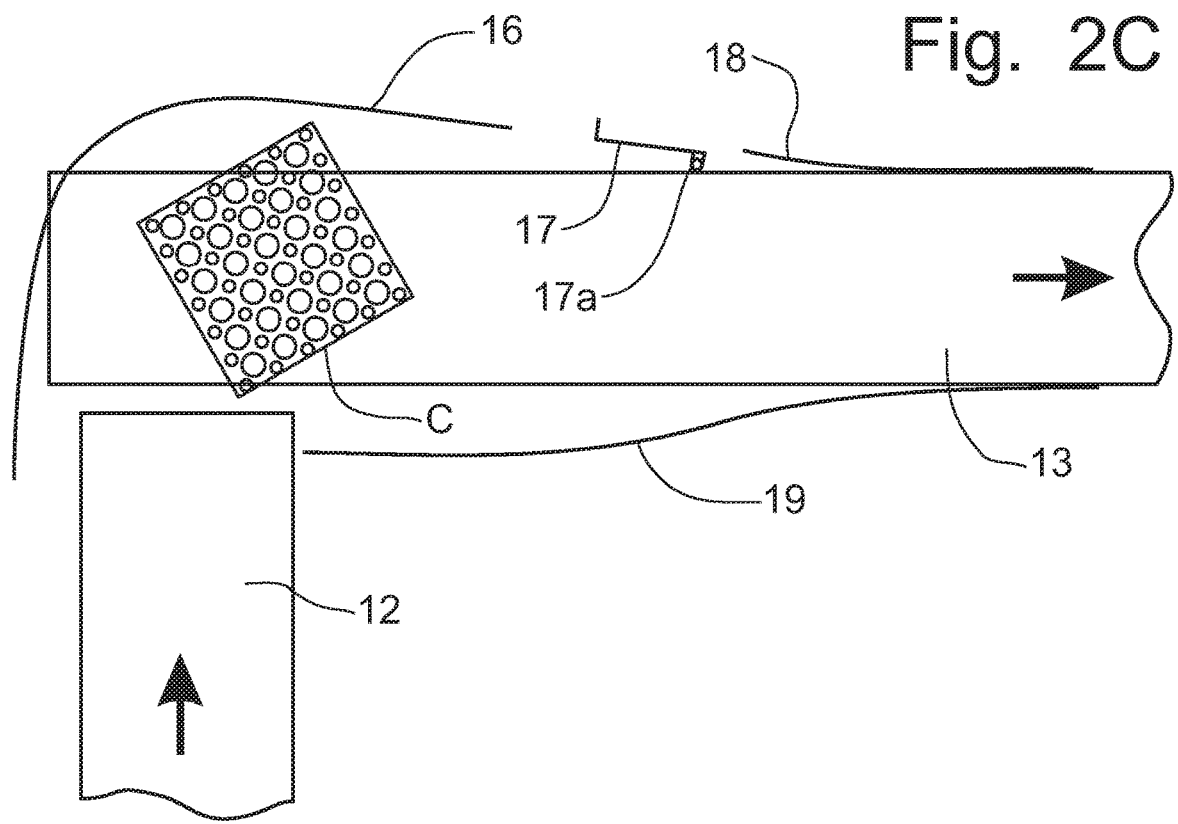
Figure 2D:
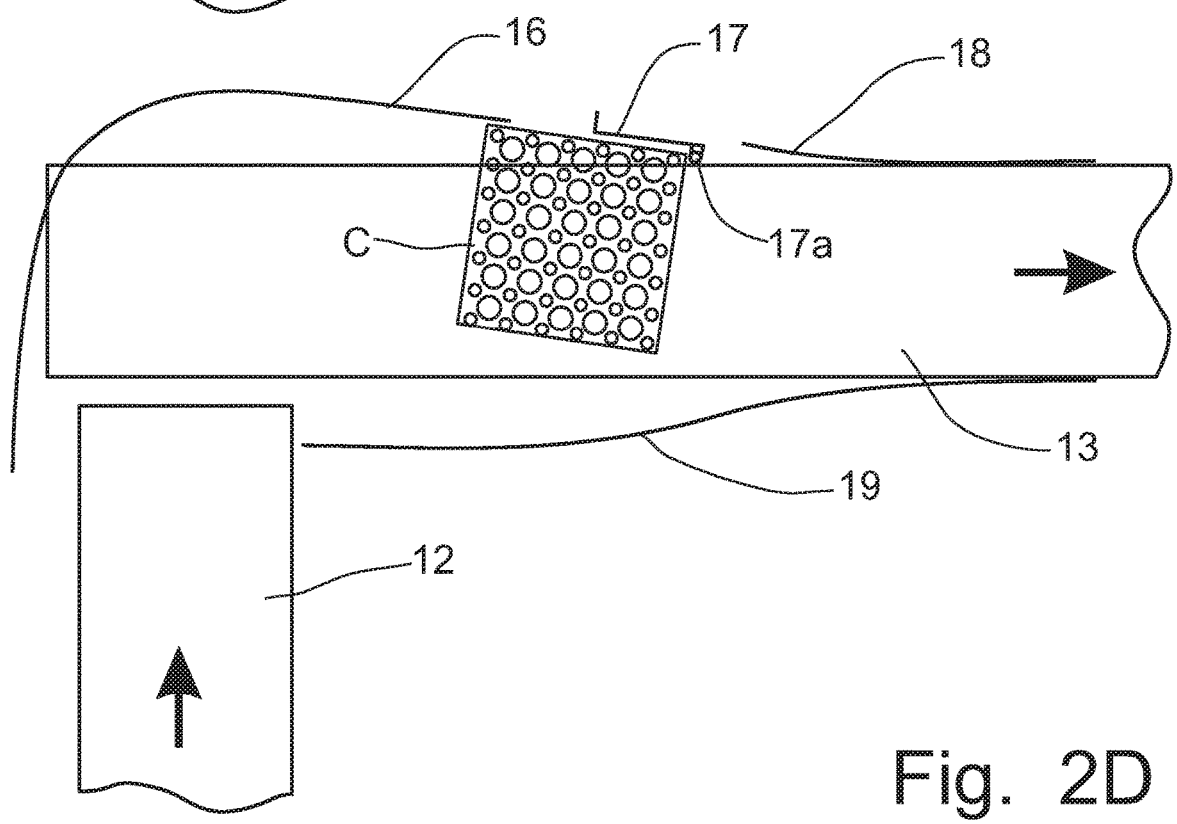
Figure 2G:
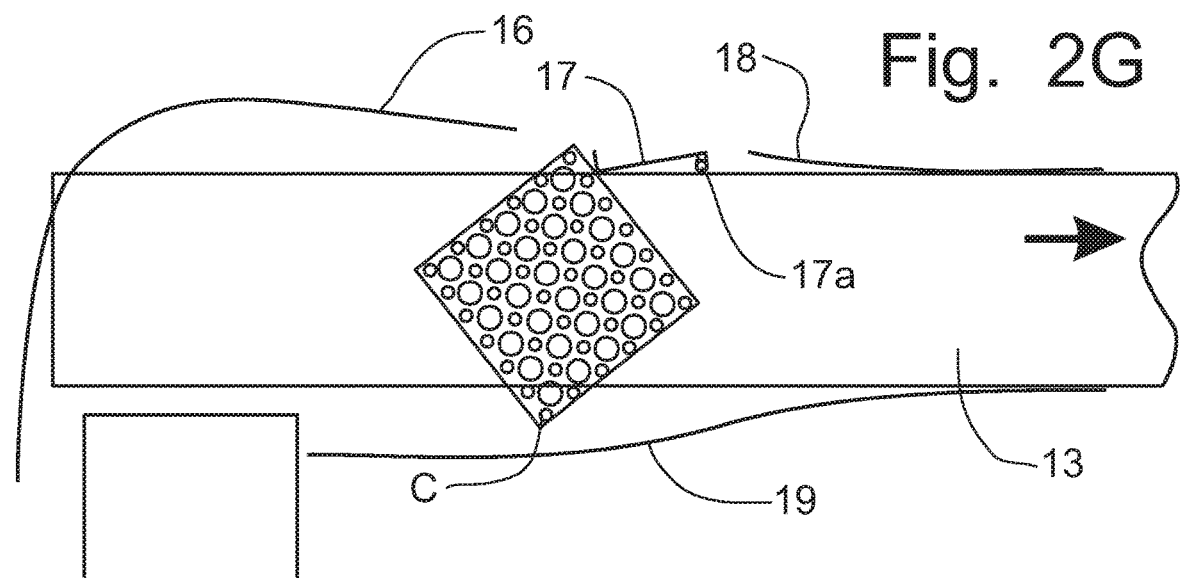
Figure 2H:
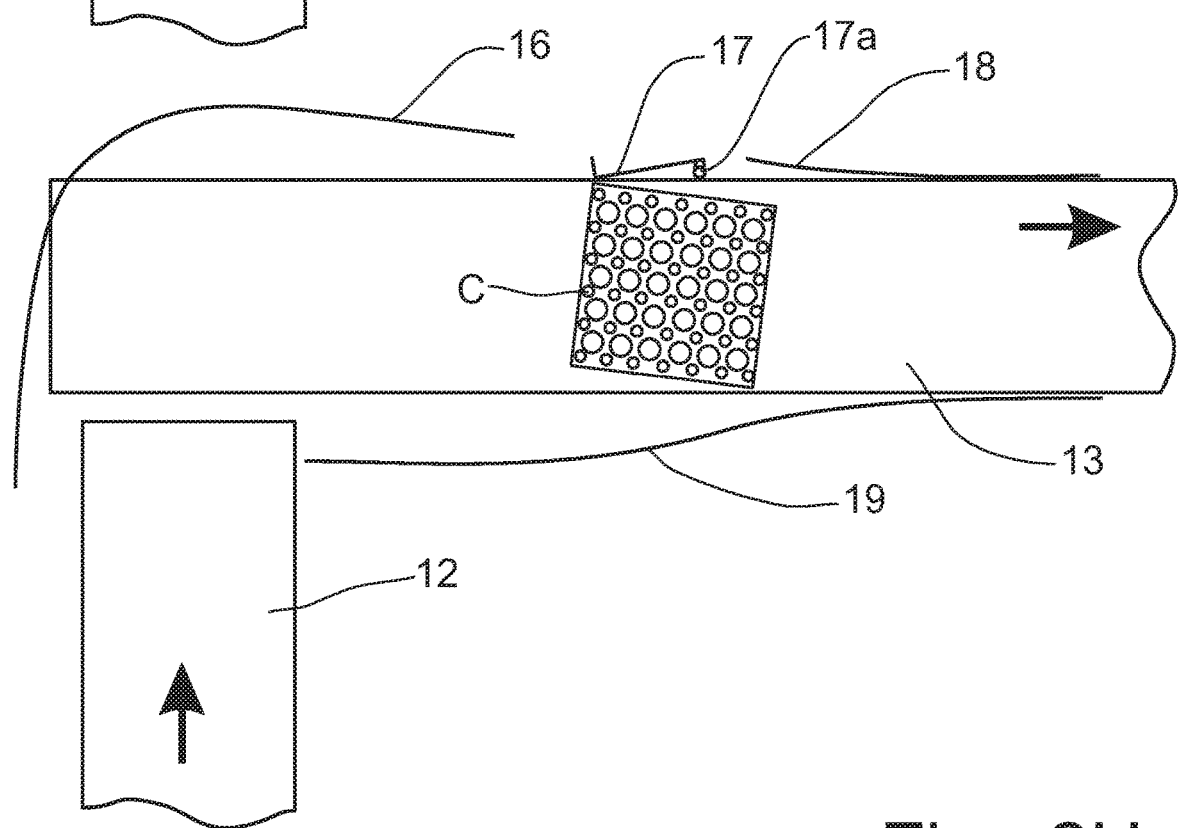

As best seen in FIGS. 2 through 2H, the orientation of the egg trays C is established at the beginning of the first conveyor 13 at the intersection with the loading conveyor 12. The first conveyor 13 is provided with guide apparatus 15 that controls the orientation of the respective egg trays C. The egg trays C always exit the loading conveyor 12 with the six egg side as the leading edge of the egg tray C, as is seen in FIG. 2A. If the egg tray C is to be presented to the stacking mechanism 20 with the six egg side as the leading edge, the egg tray C is allowed to move freely from the loading conveyor 12 onto the first conveyor 13. Since the first conveyor 13 is moving perpendicularly to the loading conveyor 12, as the egg tray C moves onto the first conveyor 13, the egg tray C starts to turn to the right, as is depicted in FIG. 2B. Once the egg tray C has completely exited the loading conveyor 12, the orientation of the egg tray is canted to the right with the six egg side being at the forward moving side of the egg tray C, as is shown in FIG. 2C.

As the egg tray C then moves along the first conveyor 13, the first curved guide member 16 along the opposing side of the first conveyor 13 from the loading conveyor 12, engages the side of the canted egg tray C and then guides the egg tray C in a manner that follows the first guide member 16, which moves the egg tray C toward the center of the first conveyor 13 with the six egg side being the leading edge, as is depicted in FIG. 2D. The pivoted guide member 17 is retracted to align with the curved path of the first curved guide member 16, which transitions the egg tray C toward the third and last guide member 18. Ultimately, when the egg tray C reaches the distal end of the guide apparatus 15, engagement of the egg tray C with the third guide member 18 and the opposing guide member 19 places the egg tray C in the center of the first conveyor 13 with the six egg side as the leading edge to be presented into the stacking mechanism 20, as is reflected in FIG. 2E.

When the next egg tray C is moved along the loading conveyor 12 onto the first conveyor 13, and the five egg side is desired to be oriented as the leading edge, the control mechanism, as will be described in greater detail below, recognizes that this is the egg tray to be oriented with the five egg side as the leading edge and pivots the pivoted guide member 17. The pivotal movement of the pivoted guide member 17 is actuated by a pneumatic cylinder 17a, or another suitable actuator, to pivot the guide member 17 about its vertical pivot 17b and position the pivoted guide member 17 into an interfering position, as will be described in greater detail below. As the egg tray C exits the loading conveyor 12, the egg tray C turns to the right into a canted position, as described above with respect to the diagrams of FIGS. 2A and 2B. As the egg tray C is moved along the first guide member 16, as described above, the forward movement of the egg tray C with the six egg side as the leading edge, the corner of the egg tray C engages the pivoted guide member 17 which has been moved into the interfering position, as best seen in FIG. 2F.

Because of the forward movement of the egg tray C induced by the first conveyor 13 which has the left front corner impeded by the engagement with the pivoted guide member 17, the egg tray C rotates about the impeded corner to re-position the five egg side as the leading edge of the egg tray C, as is depicted in FIG. 2G. Although the egg tray C will still be somewhat canted as the egg tray C releases from the interfering pivoted guide member 17, between the curved opposing guide member 19 and the guide member 18, the orientation of the egg tray C becomes centered on the first conveyor 13 at the end of the guide apparatus 15, ready for presentation into the stacking mechanism 20 with the five egg side as the leading edge of the egg tray C. Thus, alternating egg trays C are turned through a rotation of 90 degrees relative to the egg tray preceding and the egg tray succeeding to permit the alignment of the pins and sockets to provide an interlocking stack of egg trays C.

Once skilled in the art will recognize that the loading conveyor 12 may be positioned in line with the first conveyor 13, rather than perpendicularly thereto. In such loading conveyor configurations, the pivoted guide member 17 will still affect re-orientation of alternating egg trays, particularly if the opposing right guide member 19 is positioned to assure that the egg trays are moved to the left side of the first conveyor 13 where the positioning of the pivoted guide member 17, as described above, will be operable to re-orient alternate egg trays through a rotation of 90 degrees.

Figure 3A:
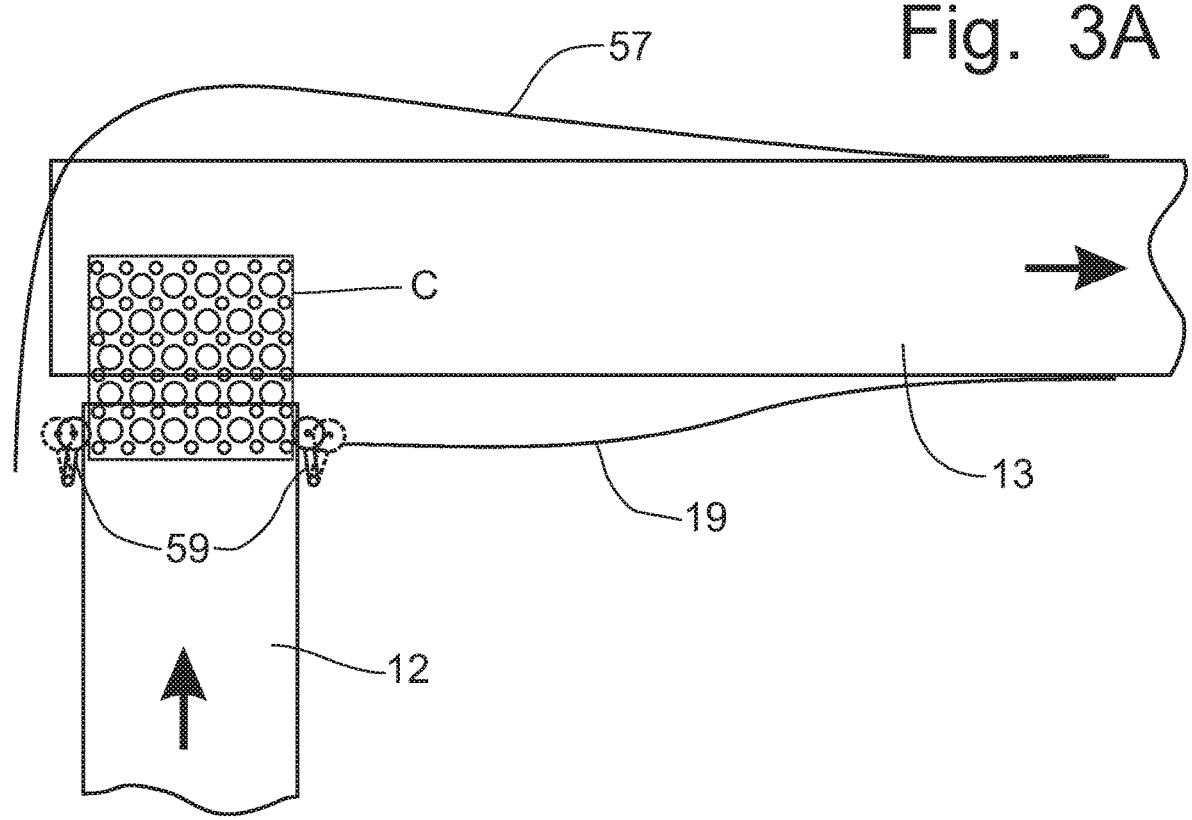
FIGS. 3A-3D are plan view, operational diagrams depicting the operation of the alternative mechanism for proper orientation of egg trays for presentation to the stacking mechanism.
Figure 3B:
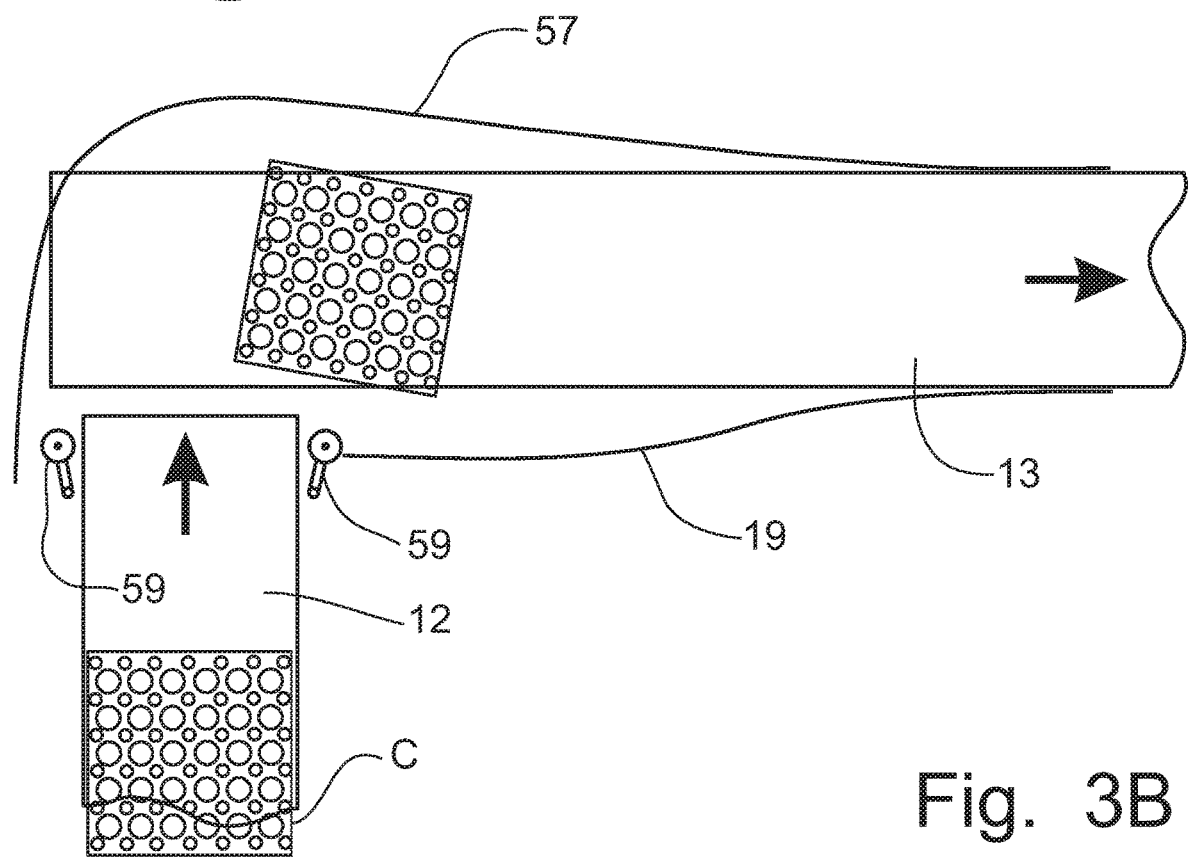
Figure 3C:
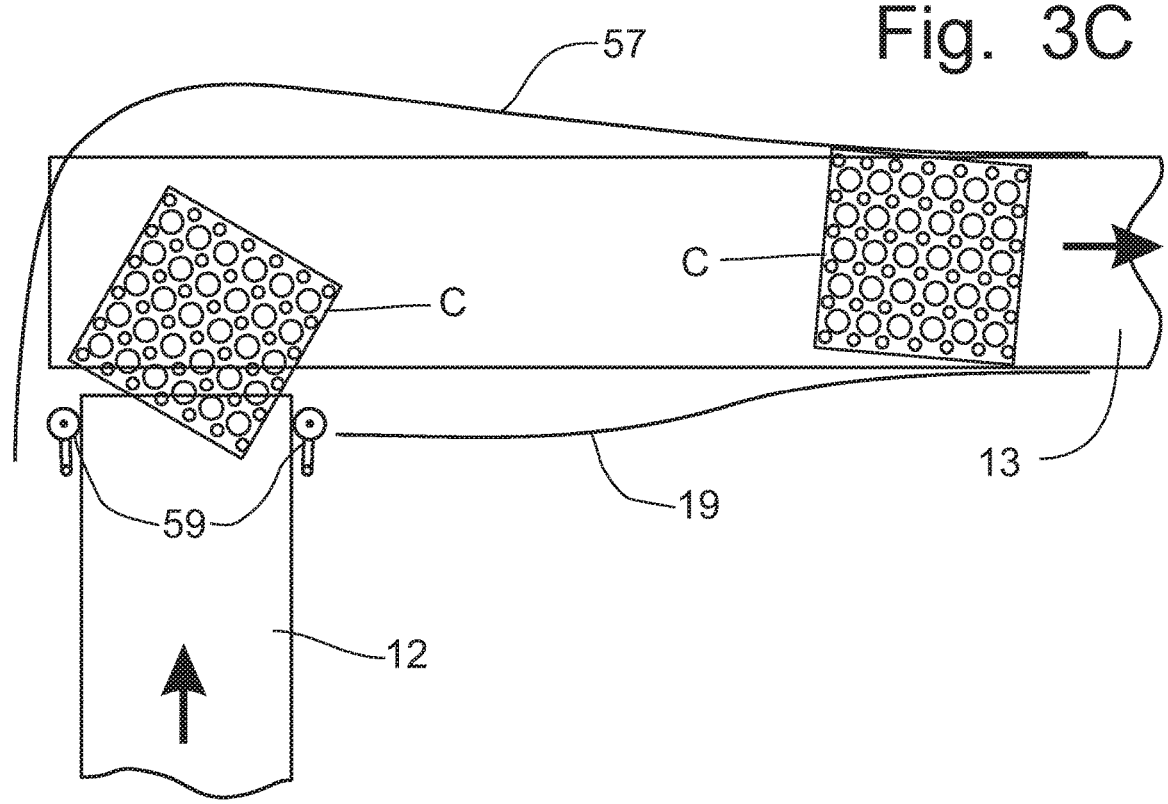
Figure 3D:
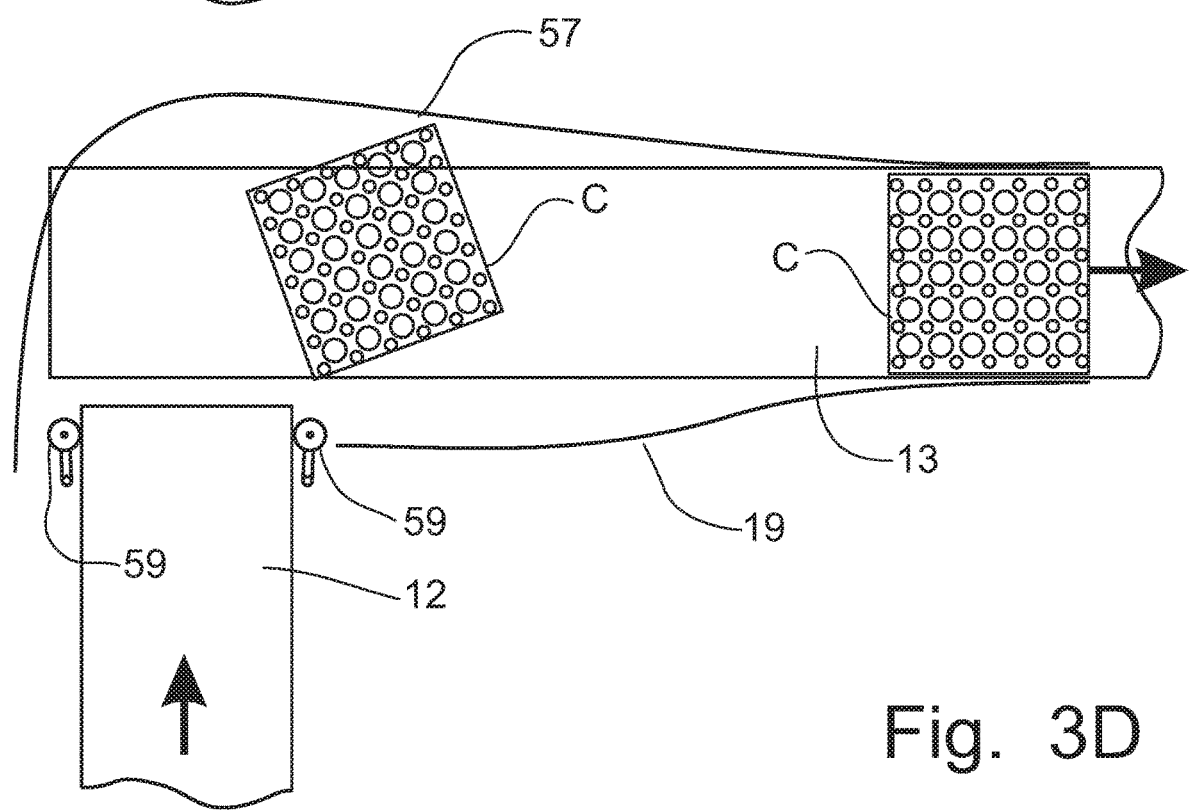

An alternative egg tray turning mechanism is shown in FIGS. 3 through 3D. Rather than a pivoted guide member 17, the guide apparatus 15 includes a first curved guide member 57 that is continuous from one end of the first conveyor 13 to the distal end of the guide apparatus 15. The opposing curved guide member 19 helps to center the egg tray C, as described above. At the discharge end of the loading conveyor 12, the loading conveyor 12 is provided with a pair of opposing powered pinch rollers 59 which a pivoted by a pneumatic cylinder (not shown), or an equivalent alternative actuator, move the powered pinch rollers 59 between an engaging position, shown in phantom lines, and a retracted position shown in solid lines in FIG. 3. The pivoted movement of the powered pinch rollers 59 is controlled through the control mechanism (not shown) that counts the egg trays C being discharged from the loading conveyor 12 so that the control mechanism (not shown) knows which egg tray C to turn 90 degrees.

To place the five egg side of the egg tray C as the leading edge, the powered pinch rollers 59 are pivoted into engagement with the opposing sides of the egg tray C, as is depicted in solid lines in FIG. 3A. As a result, the movement of the egg tray C onto the first conveyor 13 is accelerated by the powered rotation of the pinch rollers 59 such that the rotation of the egg tray induced by the perpendicular movement of the first conveyor 13 is minimized, as is depicted in FIG. 3B, although the egg tray C likely to be slightly canted, but with the five egg side positioned as the leading edge. Subsequent engagement with the opposing curved guide members 57, 19 causes the egg tray C to be centered on the first conveyor 13 ready for presentation into the stacking mechanism 20.

The succeeding egg tray C would then be oriented with the six egg side as the leading edge. This positioning and orienting of the egg tray C is done essentially identically as described above with respect to FIGS. 2A through 2E. Similarly, FIGS. 3C and 3D show the turning of the egg tray C by the perpendicular movement of the first conveyor 13 as the egg tray C more slowly exits off the loading conveyor 12, as the powered pinch rollers 59 are retracted by the control mechanism (not shown) and do not engage the sides of the egg tray C to accelerate the discharge of the egg tray C from the loading conveyor 12 onto the first conveyor 13. As a result, the egg tray C is turned more than when the egg tray is accelerated onto the first conveyor 13 and the six egg side becomes oriented as the leading edge for presentation to the stacking mechanism 20, as is depicted in FIGS. 3C and 3D, as well as FIGS. 2A through 2E.

Figure 9A:
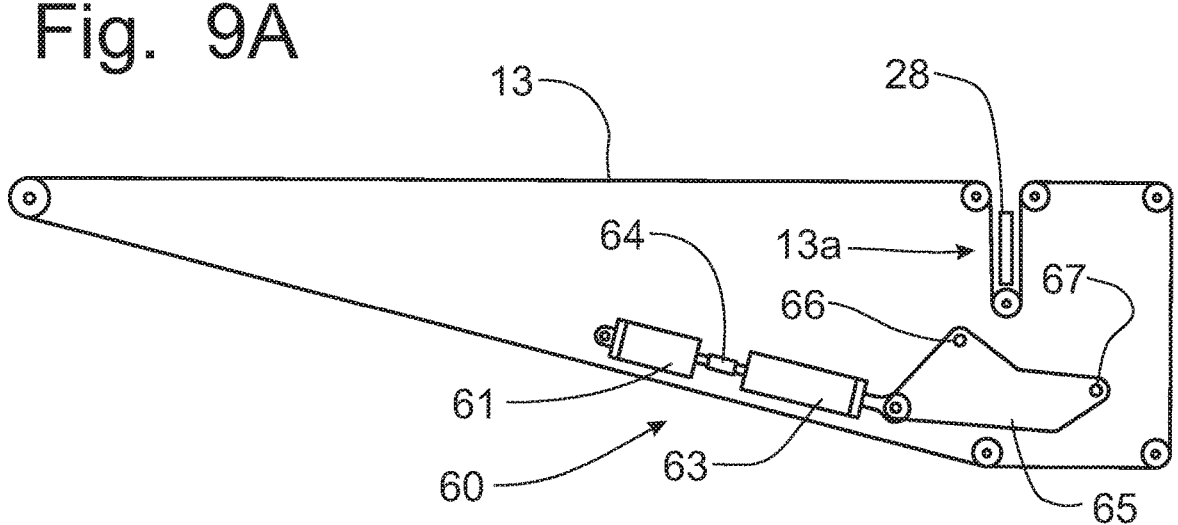
FIGS. 9A-9C is an elevational schematic view of the pneumatic cylinders for operating the vertical movement of the stacking mechanism between the lowered position, stop position and raised position, respectively.
Figure 9B:
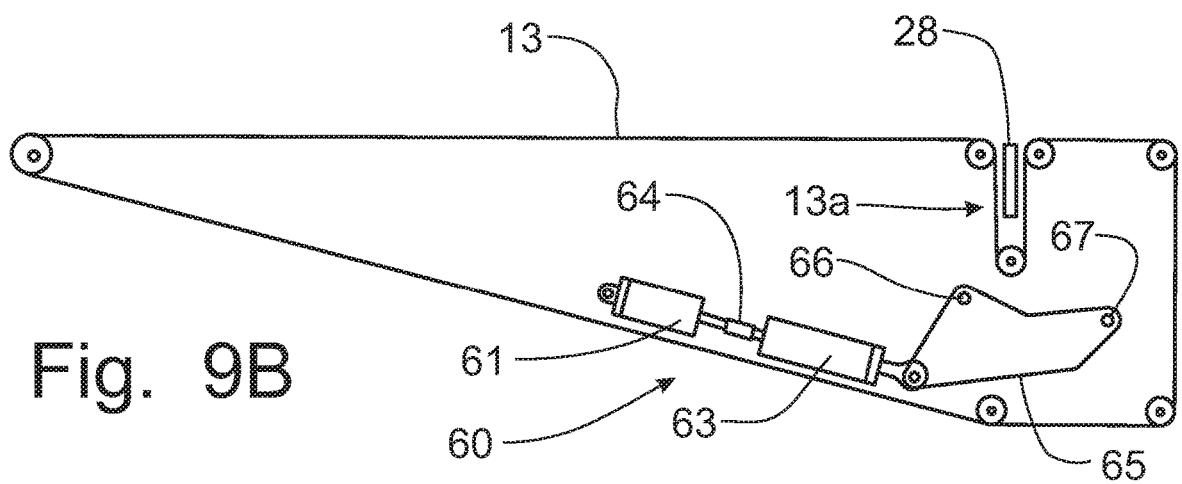
Figure 9C:
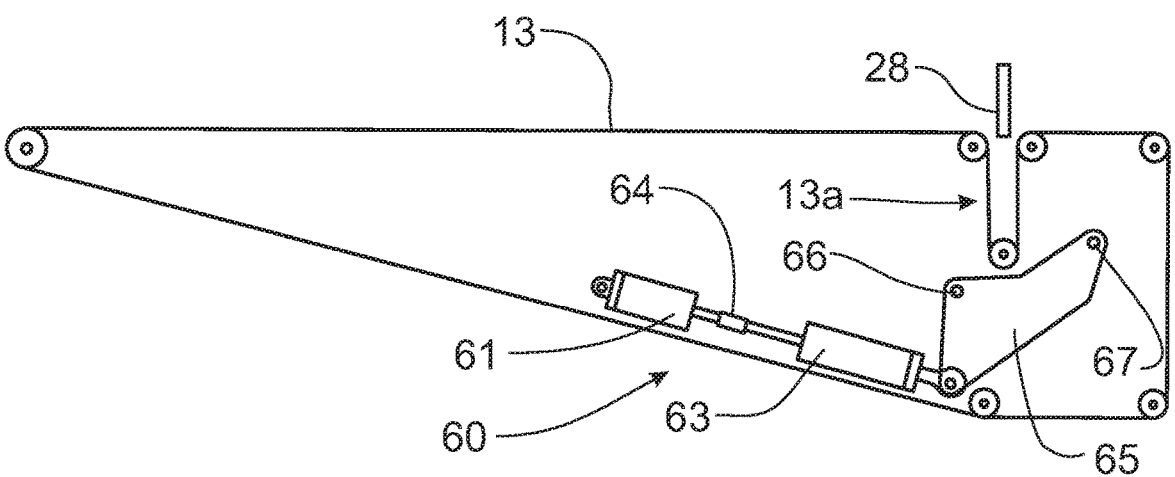

Once the egg tray C exits the guide apparatus 15 in either orientation, the egg tray is moved onto the stacker section 21 of the first conveyor 13. For reasons described in greater detail below, the first conveyor 13 preferably turns downwardly prior to the stacker section 21 and passes around a roller to turn upwardly before turning horizontally, as is depicted in FIGS. 9A-9C, to become the stacker section 21 of the first conveyor 13. This routing of the conveyor belt for the first conveyor forms a pocket 13a, as is depicted in FIGS. 9A-9C, in which the rear lifter 28 is positioned for vertical movement, as defined in greater detail below. Alternatively, the stacker section 21 could be a separate small conveyor, but this would entail a separate drive apparatus from the first conveyor, and from the stack conveyor 14, resulting in a significant increase in cost of manufacture and maintenance.

Figure 5:
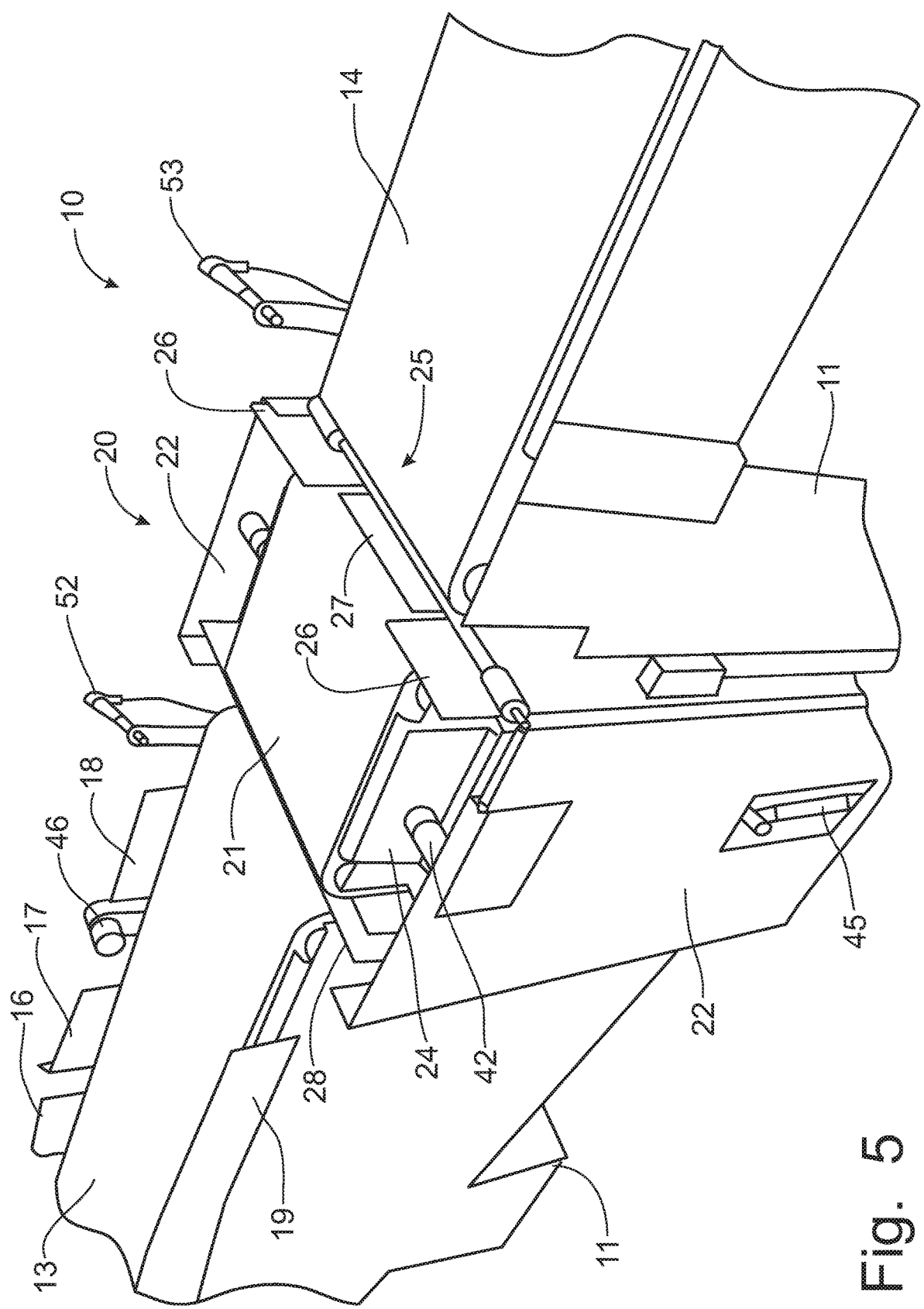
FIG. 5 is a partial right side perspective schematic view similar to that of FIG. 4, but showing the stacking mechanism in an initial stop position to stop the movement of the first egg tray into the stacking mechanism.

One novel aspect of the stacking mechanism 20 is that the stacking mechanism has a lift member 23, 24, 27 and 28 that engages the underside of the four sides of the egg tray to lift the egg tray above the surface of the stacker section 21 of the first conveyor 13. The top edge of each of these lift members 23, 24, 27 and 28 are all in the same plane. The forward stop lifter 25 includes the forward lifter member 27, as well as opposing, laterally spaced stop members 26 which project vertically above the plane of the top edge of the forward lifter member. When the first egg tray that starts the formation of a stack of egg trays passes onto the stacker section, the forward stop lifter 25 will be in a stop position, as is depicted in FIG. 5, wherein the lateral opposing stop members 26 are extended above the surface of the stacker section 21 of the first conveyor 13, while the top edge of the forward lifter member 27, as well as the top edge of the other lift members 23, 24 and 28. As a result, the first egg tray encounters the stop members 26 to arrest the forward movement of the egg tray while the stacker section 21 of the first conveyor 13 continues to move beneath the egg tray.

Each of the lift members 23, 24, 27 and 28, as well as the entire forward stop lifter 25 and other associated apparatus, as will be described in greater detail below, are supported by a housing shell 22 and vertically movable therewith to form the stacking mechanism 20. An actuator mechanism 60 is mounted within the confines of the first conveyor 13 and consists of a short stroke first pneumatic cylinder 61, a long stroke second pneumatic cylinder 63 and a pivoted bell crank 65, as is shown in FIGS. 9A-9C. One skilled in the art will recognize that the use of pneumatic cylinders is a preferred embodiment, but could be replaced by hydraulic cylinders or other linear actuators. The extendable rods of the two pneumatic cylinders 61, 63 are connected together by a coupler 64. The base of the short pneumatic cylinder 61 is fixed to the frame 11 of the apparatus 10, while the base of the long pneumatic cylinder 63 is connected to the bell crank 65. As a result, the extension of either of the pneumatic cylinders 61, 63 will cause the movement of the long pneumatic cylinder 63 relative to the fixed short pneumatic cylinder 61.

Figure 4:
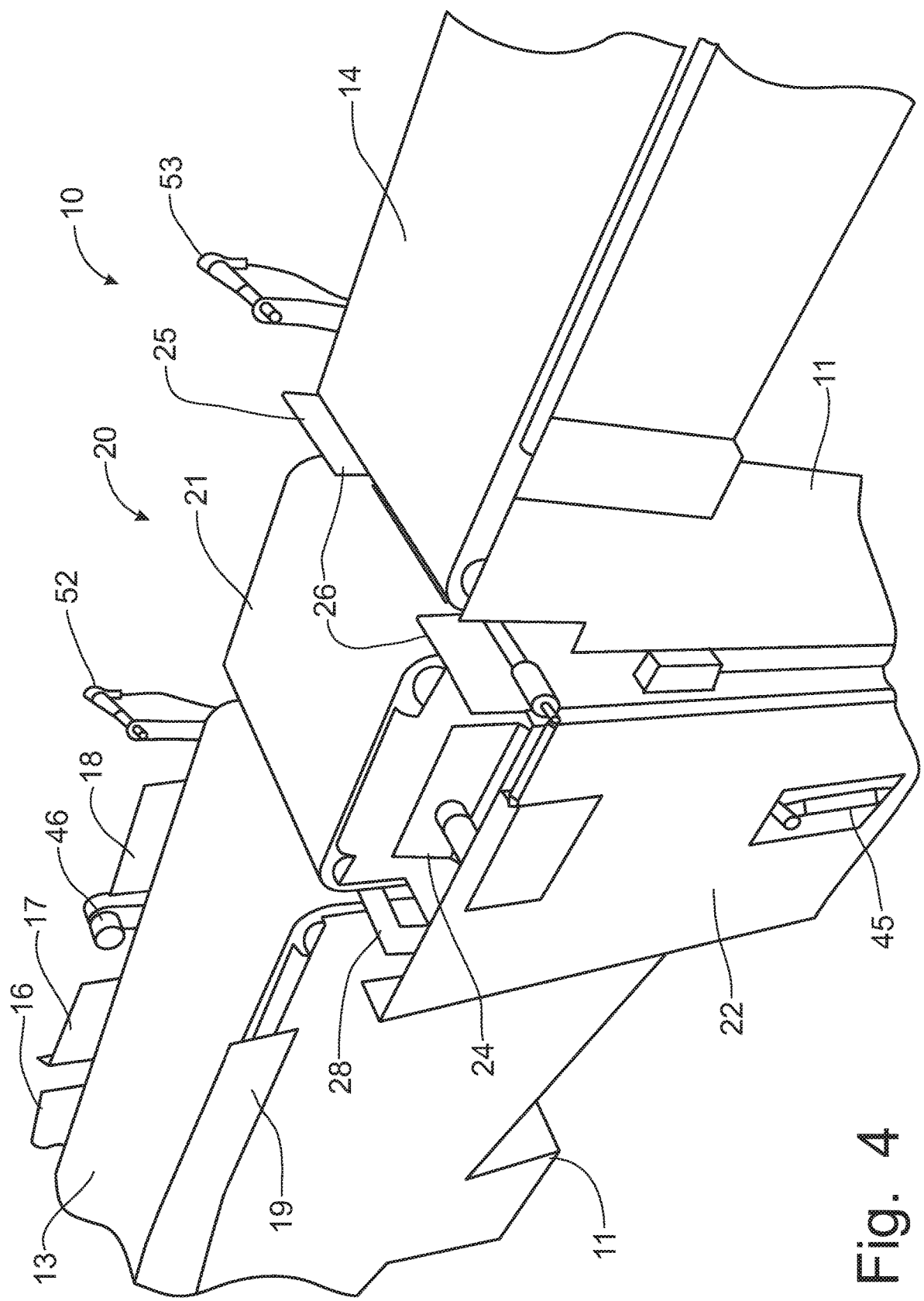
FIG. 4 is a partial right side perspective schematic view taken from along the side of the stack conveyor to show the egg tray stacking mechanism in the lowered position that enables a completed stack of egg trays to move to the stacking conveyor.

The bell crank 65 is pivotally connected to the frame 11 of the apparatus 10 at pivot 66, while the distal end of the bell crank 65 is connected to the housing shell 22 through a suitable linkage (not shown). Thus, when either of the pneumatic cylinders 61, 63 are extended, causing the long pneumatic cylinder 63 to move relative to the short pneumatic cylinder 61, the bell crank 65 is moved about the pivot 66 to affect vertical movement of the housing shell 22, along with the lifters 23, 24, 27 and 28. Referring first to FIGS. 4 and 9A, the lifters 23, 24, 27 and 28 are retracted below the surface of the stacker section 21 of the first conveyor 13, as are the stop members 26. In this configuration, the formed stack of egg trays can be moved from the stacker section 21 to the stack conveyor 14. The positioning of the housing shell 22 and the associated lifter members, 23, 24, 27 and 28, and the stop members 26, are accomplished when both the short and long pneumatic cylinders 61, 63 are retracted, as depicted in FIG. 9A.

After the formed stack of egg trays has been moved onto the stack conveyor 14, the short pneumatic cylinder 61 is extended to cause the bell crank 65 to move vertically as sufficient distance to position the housing shell 22 in a manner to locate the stop members 26 above the surface of the stacker section 21 to stop the movement of an egg tray on said stacker section 21. In this configuration, shown in FIG. 9B, the lifter members 23, 24, 27 and 28 are still below the surface of the stacker section 21. To move the lifters 23, 24, 27 and 28 into engagement with the egg tray on the stacker section 21 to elevate the egg tray above the surface of the stacker section 21, both the short pneumatic cylinder 61 and the long pneumatic cylinder 63 are extended, as depicted in FIG. 9C, to pivot the bell crank 65 higher and move the lifter members 23, 24, 27 and 28 upwardly.

Referring now to FIGS. 4-7, the details of the stacking mechanism 20 can best be seen. The stacking mechanism 20, actuated by the pneumatic cylinders 61, 63, as described above, includes four lifter members 23, 24, 27 and 28 that are positioned, respectively, on the four sides of the stacker section 21 of the first conveyor 13. The left and right lifter members 23, 24 are essentially mirror images of each other positioned, respectively on the opposing lateral sides of the stacker section 21. The left and right side lifter members 23, 24 are formed in a bent Z-shape having the lower end welded to a pivot shaft 31, 32 that enables the lifter member 23, 24 to move toward and away from the stacker section 21. This Z-shaped configuration also facilitates the connection of the left and right side lifter members 23, 24 to the respective pivot shaft 31, 32, while enabling the top edge of the left and right side lifter members 23, 24 to be in a common plane and angled inwardly for proper engagement with the corresponding sides of the egg tray to be lifted above the stacker section 21.

The left and right side lifter members 23, 24 are angled inwardly toward the stacker section 21 to facilitate operation thereof as described in greater detail below. In this shaped configuration, the weight of the side lifter member 23, 24 urges the lifter member 23, 24 to rotate toward the stacker section 21. A bumper 36, 37 positioned between the housing shell 22 and the corresponding side lifter member 23, 24 limits the pivotal movement of the side lifter members 23, 24 toward the stacker section 21, while a stop member 41, 42 limits the amount of movement of the side lifter members 23, 24 away from the stacker section 21.

The forward stop and lifter mechanism 25 includes both the stop member 26 and the forward lifter member 27. The forward lifter member 27 is welded to a pivot shaft 33 to permit movement of the forward lifter member 27 toward and away from the stacker section 21. As with the left and right side lifter members 23, 24, the forward lifter member 27 is angled toward the stacker section to facilitate movement thereof, as described in greater detail below. Accordingly, the forward stop member 27 when raised to the position shown in FIGS. 6, 7 and 9C, has a top edge that is in a common plane with the left and right side lifter members 23, 24 and is positioned further toward the stacker section 21 than the forward stop members 26. A stop bar 43 extends laterally from one side of the housing shell 22 to the other and is located forwardly of the forward lifter member 27 and forwardly of the stop members 26. The stop bar 43 is connected to tension springs 38 interconnecting the ends of the stop bar 43 and the adjacent portions of the housing shell 22 to bias the movement of the forward stop member toward the stacker section 21. The stop bar 43 is also connected to the forward lifter member 27 by fasteners (not show) which through insertion of washers and spacers (not shown) locate the top edge of the forward lifter member 27 inwardly toward the stacker section 21 relative to the stop members 26.

Figure 7:
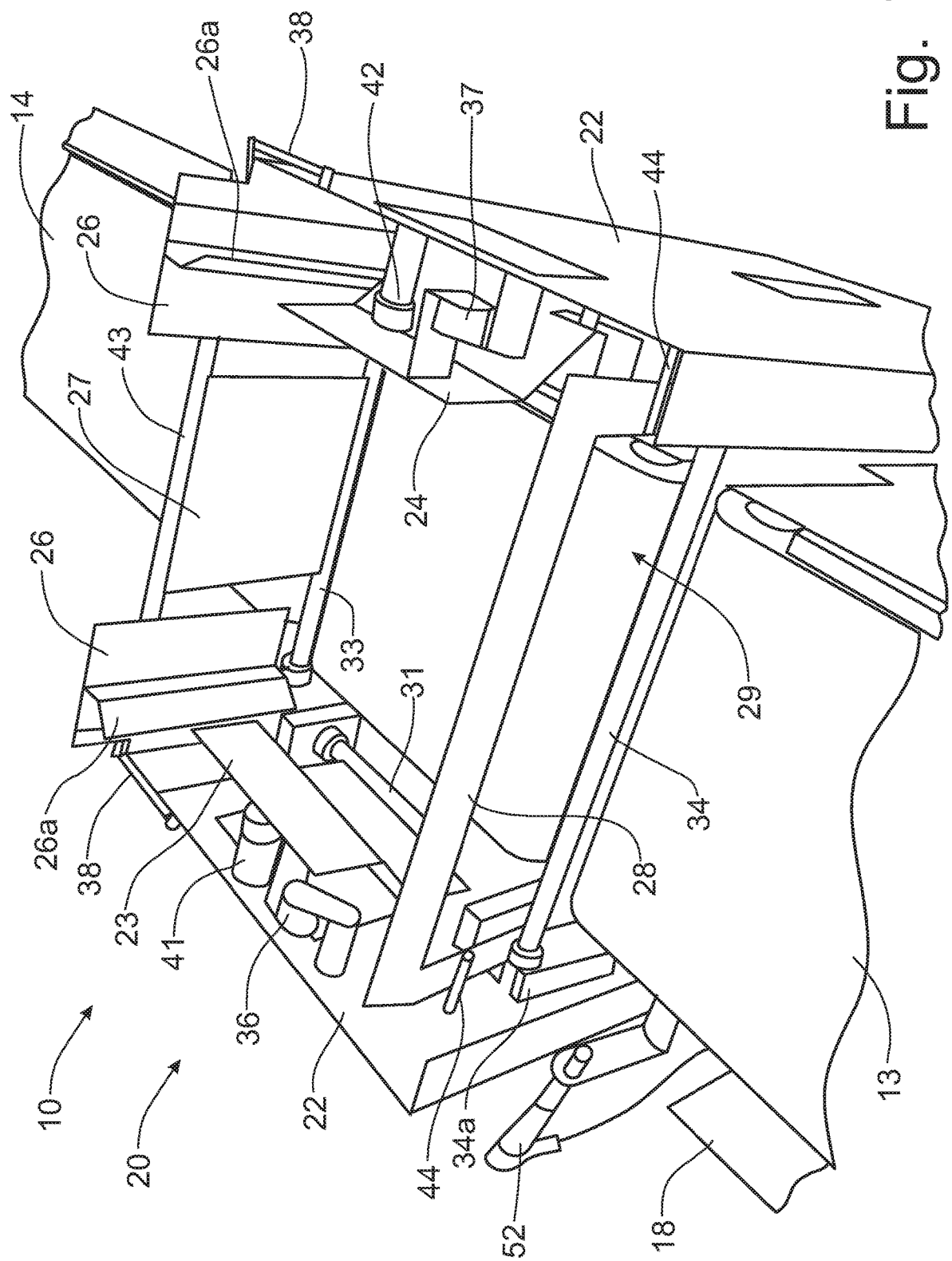
FIG. 7 is a partial right side perspective schematic view taken from along the side of the first conveyor to show the egg tray stacking mechanism in the raised position as depicted in FIG. 6.

The rear lifter member 28 resides in the conveyor pocket 13a and moves vertically with the housing shell 22 out of the pocket 13a to engage the rearward edge of the egg tray to affect lifting thereof above the surface of the stacker section 21. The rear lifter member 28 is welded to a rear pivot shaft 34 to enable movement toward and away from the stacker section 21. The rear lifter member 28 is bent forwardly, as is best seen in FIG. 7, to locate the top edge thereof in the same common plane as the top edges of the left, right and forward lifter members, 23, 24 and 27. A pair of opposing stop members 39 on opposing sides of the rear lifter member 28 limits the forward movement of the rear lifter member 28 inwardly toward the stacker section 21, while a pair of opposing spring attachment pins 44, best seen in FIG. 7, biases the movement of the rear lifter member 28 toward the stacker section 21.

Because the rear lifter member 28 spans across the path of the first conveyor 13 bringing the next egg tray toward the stacker section 21 to be added to the stack of egg trays being formed, the rear lifter member 28 is formed with a window 29 therein to enable an egg tray moving from the first conveyor 13 onto the stacker section 21 to pass through the rear lifter member 28, while the rear lifter member 28 is supporting an elevated stack of egg trays, without requiring movement of the rear lifter member 28. The movement of the egg tray passing through the window 29 of the rear lift member 28 crosses the stacker section 21 until engaging the stop members 26. A final guide member 26a is affixed to each stop member 26 to direct the incoming egg tray into the proper position for creating a stack of egg trays, as will be described in greater detail below. The rear pivot shaft 34 is seated within a pair of opposing plastic blocks 34a that are formed with an open top surface that enables the rear pivot shaft 34 to rise relative to the plastic blocks 34a in the event the stacking mechanism 20 is being lowered but an egg tray, or other object, has not cleared the rear lifter member 28. The ability for the pivot axis to rise prevents the rear lifter member 28 from becoming a guillotine. The spring attachment pins 44 draw the rear lifter member 28 forward and the pivot shaft downward into the saddle of the plastic blocks 34a once the obstruction has been cleared.

Figure 8:
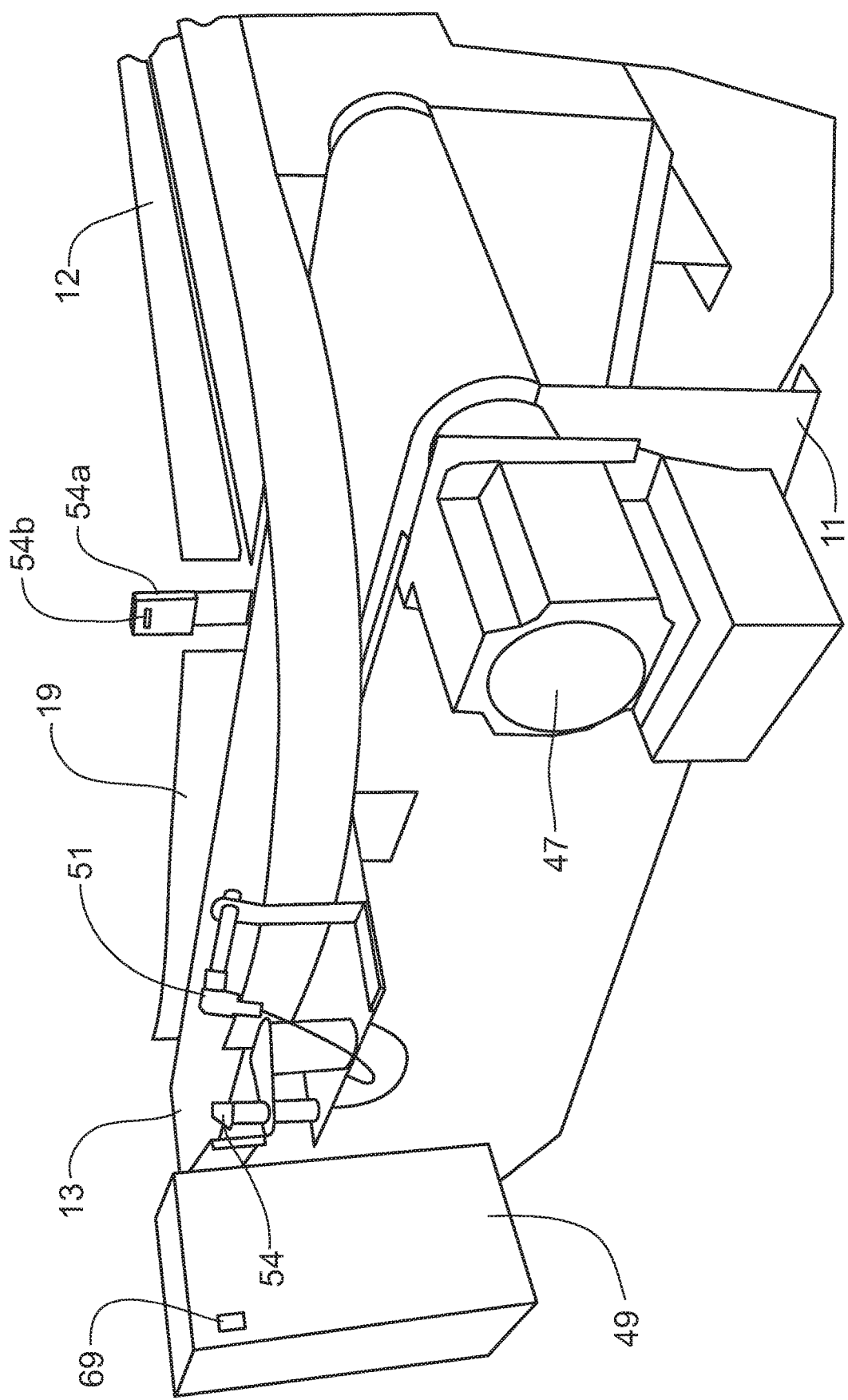
FIG. 8 is a partial left side perspective view of the intersection of the loading conveyor with the first conveyor.

As best seen in FIGS. 5 and 8, the apparatus 10 includes sensors and a control mechanism for the automatic operation of the apparatus 10. A first proximity sensor 51 is located near the beginning of the first conveyor 13 at the intersection with the loading conveyor 12 to determine if the egg trays are moving along the first conveyor 13 from the loading conveyor 12. Also near the beginning of the first conveyor 13 is a height sensor 54 that includes a light, preferably infrared light, transmitter and a reflector 54a that reflects a horizontal beam of light back to the sensor 54 from the horizontal slot 54b. The height sensor 54 identifies a possible double stacking of eggs into a single socket in the egg tray, which would cause problems during the stacking.

A second proximity sensor 52 is located along the first conveyor 13 just before the stacker section 21. The second proximity sensor 52 identifies an egg tray that would be positioned rearwardly of the pocket 13a in which the rear lifter member 28 resides. A third proximity sensor 53 is located along the beginning of the stack conveyor 14 to identify any stack of egg trays that might be positioned just outside of the stacker section 21. Also, as is best seen in FIGS. 4 and 5, a pneumatic blocker 46 is provided between the pivoted guide member 17 and the third guide member 18. The blocker 46 is capable of selective extension to prevent any egg trays moving along the first conveyor from passing the blocker 46 and approaching the stacking mechanism 20.

As is representatively depicted in FIG. 8, the apparatus 10 includes a control box 49 that houses the control mechanism which preferably includes a microprocessor that receives signals from the respective sensors 51-54 and provides automatic operation of the egg tray stacking apparatus 10. When the third proximity sensor 53 detects a stack of egg trays that has not completely exited the stacking mechanism 20, the operation of the egg tray stacking apparatus 10 described in greater detail below means that the entire stack conveyor 14 to the bumper 55 at the end of the stack conveyor 14 is filled with stacks of egg trays, and the operation of the apparatus 10 needs to be halted. Similarly, if the first proximity sensor 51 detects an egg tray that is not moving along the first conveyor 13, there is a problem that requires manual attention and a halting of the operation of the apparatus 10. Furthermore, the control mechanism counts the egg trays passing the first proximity sensor 51 to make a decision as to whether or not to turn the respective egg tray for proper presentation to the stacking mechanism 20.

If the height sensor 54 identifies an egg that is not properly positioned within a corresponding socket in the egg tray, manual attention to this problem is required and the control mechanism will halt operation of the apparatus 10. The second proximity sensor 52 identifies an egg tray passing into the stacking mechanism 20. When the stacking mechanism 20 is cycling through from the raised position to the stop position, the control mechanism signals the pneumatic blocker 46 to extend and prevent any egg trays from approaching the stacking mechanism 20 when the stacking mechanism is not in the raised position. If the second proximity sensor 52 identifies an egg tray adjacent the stacking mechanism 20 at the wrong time of the cycling of the stacking mechanism 20, the control mechanism can stop the running of the first conveyor 13 to prevent the egg tray from improperly entering the stacking mechanism 20.

In operation, the egg tray stacking apparatus 10 receives egg trays filled with eggs from the loading conveyor 12, where known devices separate the egg trays and fills the sockets therein with eggs. Depending on the count of the egg tray received on the first conveyor 13, the egg tray is either allowed to turn into an orientation that presents the six egg side as the leading edge for presentation to the stacking mechanism 20, if the egg tray is an odd number, or the pivoted guide member 17 is actuated to affect a further turning of the egg tray to present the five egg side as the leading edge into the stacking mechanism 20, if the egg tray is an even number. The guide members 16-19 operate to position the egg tray in a centered position on the first conveyor 13 as the egg tray approaches the stacking mechanism 20.

For the first egg tray to be presented to the stacking mechanism 20, the control mechanism extends the short pneumatic cylinder 61 to move the stop members 26 above the surface of the stacking section 21 so that the egg tray passing over the top of the rear lifter member 28, which is retracted below the surface of the first conveyor 13 and the stacker section 21, onto the stacker section 21 engages the stop members 26 and stops forward movement, even though the stacker section 21 continues to move beneath the egg tray. With the presumptions noted above with odd number egg trays having the six egg side as the leading edge, this first egg tray will have the leading edge engaged with the stop members 26. One skilled in the art will recognize that whether the first egg tray in a stack to be formed has the six egg side or the five egg side as the leading edge is irrelevant so long as alternating egg trays are turned in the other orientation to allow the pins and sockets of the vertically stacked egg trays to interengage and provide a stable stack structure.

Figure 6:
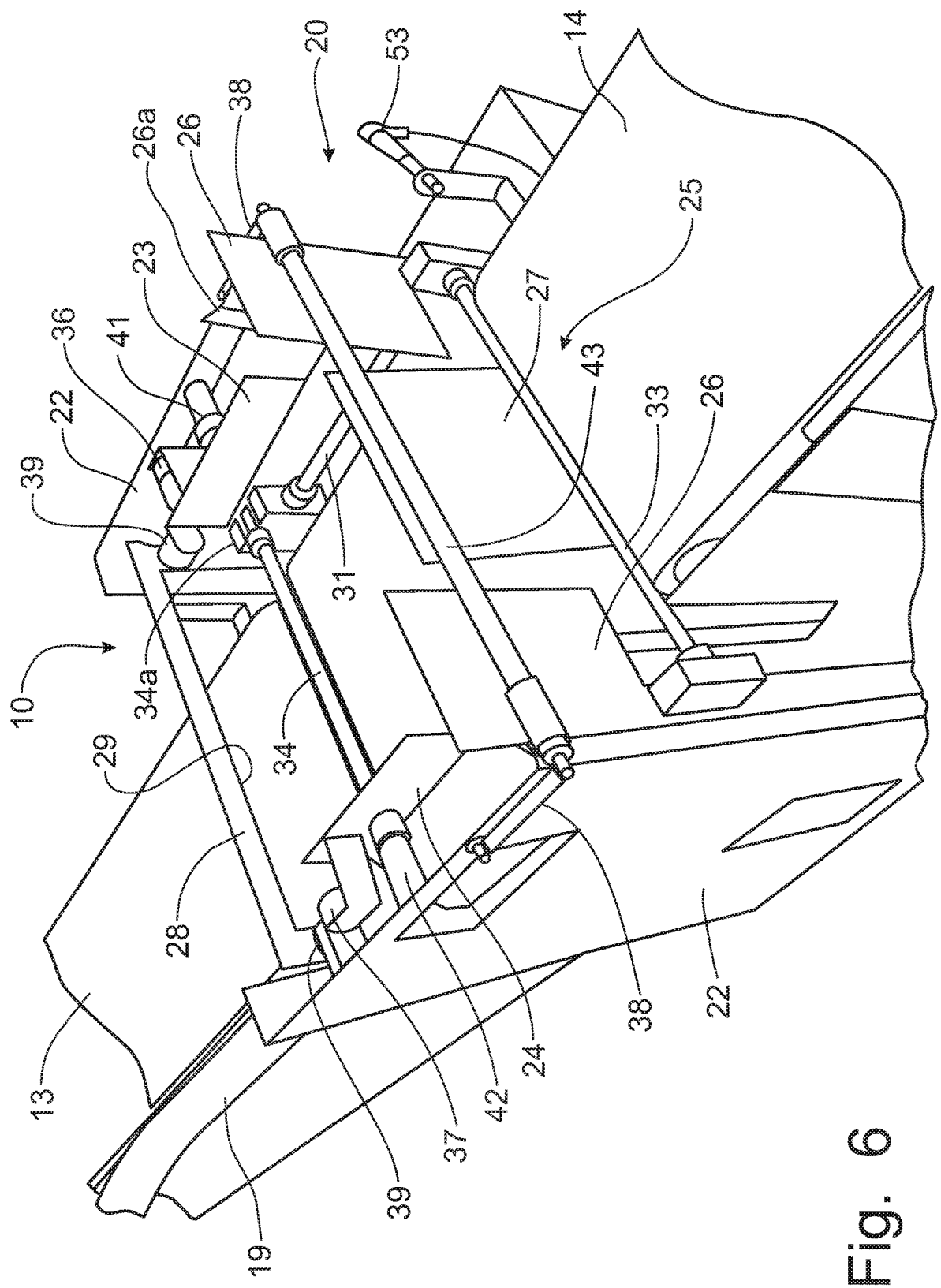
FIG. 6 is a partial right side perspective schematic view similar to that of FIG. 5, but showing the stacking mechanism in a raised position to locate a partially formed stack of egg trays above the stacker section of the first conveyor to permit the entrance of a new egg tray to be added to the bottom of the stack according to the principles of the instant invention.

Once the first egg tray ceases forward movement by engagement with the stop members 26, the control mechanism powers the long pneumatic cylinder 63 to pivot the bell crank 65 in a manner that raises the housing shell 22 and the associated lifter members 23, 24, 27 and 28 into engagement with the underside of the corresponding four sides of the egg tray to elevate the egg tray above the surface of the stacker section 21. Once the housing shell 22 reaches the fully raised position, as depicted in FIGS. 6 and 7, the rear lifter member 28 is positioned to allow the passage of the second egg tray through the window 29 and onto the stacker section 21. When the lifter members 23, 24, 27 and 28 are in the fully raised position, the stop members 26 are long enough to reach below the surface of the stacker section 21 and still engage the incoming egg tray.

When the second egg tray ceases forward movement by engaging the stop members 26, the control mechanism cycles the long pneumatic cylinder 63 to retract and pull the housing shell 22 back to the stop position. This action lowers all of the lifter members 23, 24, 27 and 28 to deposit the first egg tray on top of the second egg tray. Since the two egg trays are oriented 90 degrees to one another, the pins on the second egg tray align with the sockets on the first egg tray to start the formation of a stack of egg trays. Meanwhile, the continued lowering of the lifter members 23, 24, 27 and 28 results in the lifter members 23, 24, 27 and 28 deflecting away from the egg trays through the pivotal movement of the corresponding pivot shafts 31-34, as the lift members pass over the corresponding edges of the second egg tray still on the surface of the stacker section 21. After the lifter members 23, 24, 27 and 28 drop below the second egg tray, the biasing springs 36-39 return the respective pivoted lifter member toward the stacker section 21.

The control mechanism then causes the long pneumatic cylinder to extend again to cause the lifter members 23, 24, 27 and 28 to move to the fully raised position, elevating the partially formed stack of egg trays above the surface of the stacker section 21. As the partially formed egg tray is being elevated by the stacking mechanism 20, the pneumatic blocker 46, which had been extended when the second sensor detected the presence of the egg tray moving into the stacker section 21, is retracted to release the next egg tray toward the stacking mechanism 20. The control mechanism knows the speed of movement of the first conveyor and stacker section 21, as well as the distance from the second sensor 52 to the stop members 26, and thus knows the time required to move an egg tray into position against the stop members 26 in order to actuate the pneumatic cylinders 61, 63 for movement of the stacking mechanism 20. Therefore, the second sensor 52 provides the requisite signal for the control mechanism to operate the stacking mechanism 20.

The process of lowering the partially formed stack of egg trays onto the egg tray positioned on the stacker section 21 is repeated until the egg tray on the stacker section 21 is the sixth egg tray being added to the partially formed stack of egg trays elevated above the stacker section 21, as determined by the counting of the egg trays by signals sent by the first and second proximity sensors 51, 52. Once the elevated partially formed stack of egg trays is placed on top of the sixth egg tray on the stacker section 21, the control mechanism retracts both the short and long pneumatic cylinders 61, 63 to lower the housing shell 22 and the associated lifter members 23, 24, 27 and 28, and the stop members 26 below the surface of the stacker section 21. The stack conveyor 14 is then actuated to receive the full stack of six egg trays from the stacker section 21. While the first conveyor 13 and stacker section 21 is operated continuously, the stack conveyor 14 is only operated intermittently when receiving a completed stack of egg trays from the stacker section 21. The completed stack of egg trays is moved a predetermined distance along the stack conveyor 14, which is just enough to move the stack past the third proximity sensor 53.

The competed stacks of egg trays are retained on the stack conveyor 14 until removed for shipping, which is a continuous process. If something happens to interrupt the removal of the completed stacks of egg trays from the stack conveyor 14, the stack conveyor 14 will received newly completed stacks until the stack conveyor 14 is filled with completed stacks of egg trays. Because of the intermittent operation of the stack conveyor 14 and the operation of the third proximity sensor 53, there is typically a space between completed stacks of egg trays. Once the leading egg tray, i.e. the first completed stack hits the bumper 55 at the end of the stack conveyor 14, the stack conveyor 14 will move beneath the completed stack, preferably pushing newly completed stacks of egg trays onto the stack conveyor 14 until the spacing between all of the stacks is eliminated. At this point, the newly completed stack of egg trays has nowhere to go and the third proximity sensor 53 sees the newly completed stack and signals the control mechanism to stop operation of the stack conveyor 14, even intermittently. Also at this point, the third proximity sensor 53 determines that the newly completed stack of egg trays has not properly exited the stacking mechanism 20 and signals the control mechanism to stop operation of the apparatus 10.

Once the newly created stack of egg trays has properly exited the stacking mechanism 20, the control mechanism actuates the short pneumatic cylinder 61 to move the stacking mechanism 20 into the stop position and the egg tray count returns to one with the entry of the next egg tray onto the stacker section 10 and the engagement thereof with the stop members 26. The apparatus 10 then builds a new stack of six egg trays as described above.

In the event the control mechanism stops working correctly, a manual bypass switch 69 can be depressed to cause the microprocessor, sensors 51-54, pneumatic cylinders 61, 63, pivoted guide member 17, and stacking mechanism 20 to be disengaged and stop working. The first conveyor and stack conveyor will still be operatively powered to bring egg trays from the loading conveyor to the stack conveyor in unchanging orientations. The stop members 26 and lifter members 23, 24, 27 and 28 will be dropped to the fully retracted position so that egg trays will flow through the stacker section 21 and move directly onto the stack conveyor 14. The egg trays can then be stacked manually, re-orienting alternate egg trays, to build egg tray stacks which can then be shipped. This bypass switch 69 feature enables the eggs to be cleared out of the loading apparatus until the egg stacking apparatus can be repaired and returned to operation.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An egg tray stacking apparatus, comprising:
a loading conveyor carrying a supply of egg trays to be formed into a stack;
a first conveyor oriented perpendicularly to said loading conveyor and being positioned to receive egg trays from said loading conveyor;
an egg tray orientation control mechanism at an intersection of said loading conveyor and said first conveyor to orient alternating egg trays perpendicularly to adjacent egg trays so that the orientation of egg trays on said first conveyor alternates in succeeding egg trays, said egg tray orientation control mechanism including a fixed arcuate guide member that directs the movement of an egg tray to a linear guide member and onto said first conveyor, said linear guide member including a pivotable stop member and a guide portion, said stop member being moveable between a retracted position in which said stop member is in alignment with said guide portion of said linear guide member and an extended position that engages said egg tray to force rotation of said egg tray into an alternate orientation for movement along said first conveyor, said stop member being actuated to move to said extended position for alternating egg trays moving along said linear guide member; and
a stacking mechanism operable at a stacking location along said first conveyor, said stacking mechanism including a stop member operable to stop an incoming egg tray along said first conveyor and a lift mechanism to elevate the stopped egg tray above said first conveyor to form a stack of egg trays, said stacking mechanism including a forward stop member, a plurality of pivoted lifter members for engaging a peripheral underside of all four sides of an egg tray, and an actuator mechanism operably connected to said lifter members to control the vertical positioning thereof, said actuator mechanism is operable to position selectively said stacking mechanism in three vertically spaced positions, including a first stop position, a stack elevating position and a retracted position to permit passage of a fully completed stack of egg trays, said actuator mechanism being formed from first and second pneumatic cylinders having rods connected together, each of said pneumatic cylinders having extending and retracted positions, said actuator mechanism being operable to extend said forward stop member above an upper surface of said first conveyor while said lifter members are positioned below the upper surface.

2. The egg tray stacking apparatus of claim 1 wherein said egg tray orientation control mechanism comprises:
a pair of opposing powered pinch rollers mounted on opposing sides of said loading conveyor and being selectively engagable with egg trays moving from said loading conveyor onto said first conveyor, the engagement of said pinch rollers with corresponding sides of said egg tray causing said egg tray to accelerate onto said first conveyor so that the movement of said first conveyor does not have sufficient time to cause the egg tray to turn significantly.

3. The egg tray stacking apparatus of claim 1 wherein the extension of said first pneumatic cylinder and the retraction of said second pneumatic cylinder placing said lift member in said stop position, the extension of both said first and second pneumatic cylinders placing said lifter members in said stack elevating position, and the retraction of both said first and second pneumatic cylinders placing said lifter members in said retracted position.

4. The egg tray stacking apparatus of claim 1 wherein one of said lifter members is a rear lifter member positioned rearwardly of said stacking mechanism, said rear lifter member including a window formed therein to permit passage of an incoming egg tray into said stacking location when said stacking mechanism has said partially formed stack elevated.

5. An egg tray stacking apparatus comprising:
a loading conveyor carrying a supply of egg trays to be formed into a stack;
a first conveyor oriented perpendicularly to said loading conveyor and being positioned to receive egg trays from said loading conveyor;
an egg tray orientation control mechanism at an intersection of said loading conveyor and said first conveyor to orient alternating egg trays perpendicularly to adjacent egg trays so that the orientation of said egg trays on said first conveyor alternates in succeeding egg trays;
a stacking mechanism operable at a stacking location along said first conveyor, said stacking mechanism including a lifter member for engaging each side of an egg tray and elevating successive egg trays to form a stack of egg trays, said stacking mechanism including a forward stop member operable to stop an incoming egg tray along said first conveyor while said lifter members are retracted below the surface of said first conveyor and a rear lifter member located transversely of said first conveyor and being movable vertically to engage a rearward side of said incoming egg tray stopped by said stop member, said rear lifter member having a window formed therein for the passage of said incoming egg trays into said stacking location while a partially formed stack of egg trays is elevated by said lifter members; and
an actuator mechanism operatively connected to said stacking mechanism to move said stacking mechanism vertically in a selective manner between three vertically spaced positions.

6. The egg tray stacking apparatus of claim 5 wherein said actuator mechanism includes dual pneumatic cylinders connected together to be operable to position said lifter member in said three vertically spaced positions, including a first stop position, a stack elevating position and a retracted position to permit passage of a fully completed stack of egg trays to a stack conveyor.

7. The egg tray stacking apparatus of claim 6 wherein said actuator mechanism includes a short pneumatic cylinder and a long pneumatic actuator connected to said short pneumatic cylinder, said actuator mechanism being connected to a bell crank which is operatively connected to said stacking mechanism, each of said pneumatic cylinders having extending and retracted positions, the extension of said short pneumatic cylinder and the retraction of said long pneumatic cylinder placing said lifter members in said stop position, the extension of both said first and second pneumatic cylinders placing said lifter members in said stack elevating position, and the retraction of both said first and second pneumatic cylinders placing said lifter members in said lowered position.

8. An egg tray stacking apparatus comprising:
a loading conveyor carrying a supply of egg trays in a first orientation to be formed into a stack;
a first conveyor oriented perpendicularly to said loading conveyor and being positioned to receive egg trays from said loading conveyor;
a movable guide member mounted on said first conveyor and being movable between a retracted position and an engagement position, the positioning of said movable guide member into said engagement position engages a corner of an egg tray moving along said first conveyor to allow said engaged egg tray to rotate approximately ninety degrees to affect an orientation of alternating egg trays in different orientations with odd numbered egg trays being in a first orientation and even numbered egg trays being in a second orientation perpendicular to said first orientation;
a stacking mechanism operable at a stacking location along said second conveyor, said stacking mechanism including:
a forward stop member operable to stop an incoming egg tray along said first conveyor; and
four lifter members corresponding respectively to the four sides of said incoming egg tray stopped by said forward stop member within said stacking mechanism, said lifter members being selectively movable in unison vertically to elevate said incoming egg tray; and
an actuator mechanism operably connected to said stacking mechanism to control the vertical positioning of said forward stop member and said four lifter members, said actuator mechanism being operable to position said lifter members in three vertically spaced positions, including a stop position, a stack elevating position and a retracted position that permits passage of a fully completed stack of egg trays past said forward stop member to a stack conveyor.

9. The egg tray stacking mechanism of claim 8 wherein said actuator is formed from first and second pneumatic cylinders connected together, each of said pneumatic cylinders having extending and retracted positions, the extension of said first pneumatic cylinder and the retraction of said second pneumatic cylinder placing said lifter members and said forward stop member in said stop position with the forward stop member projecting above the surface of the first conveyor and the lifter members retracted below the first conveyor, the extension of both said first and second pneumatic cylinders placing said lifter members in said stack elevating position in which said lifter members are raised above the surface of the first conveyor to place a partially formed stack of egg trays in an elevated position, and the retraction of both said first and second pneumatic cylinders placing said lifter members and said forward stop member below the surface of the first conveyor so that a completed stack can move onto a stack conveyor.

10. The egg tray stacking apparatus of claim 9 wherein said lifter members include a rear lifter member that extends transversely across said first conveyor rearwardly of said stacking location, said rear lifter member having a window formed therein to permit the passage of said incoming egg trays into said stacking location when said rear lifter member is raised into said stack elevating position.

11. The egg tray stacking apparatus of claim 10 wherein each said lifter member is mounted on a pivot axis to permit movement of said lifter members away from said egg tray to permit said lifter members to release the partially formed stack on top of the incoming egg tray and relocate beneath the incoming egg tray to elevate the stack including the incoming egg tray above said stacker location.

12. The egg tray apparatus of claim 11 wherein each said lifter member is biased by a spring member toward a position canted inwardly toward the incoming egg tray, the movement of said egg trays away from said incoming egg tray being against said bias, which returns said lifter members to said inwardly canted position after clearing below said incoming egg tray.

13. The egg tray apparatus of claim 8 further comprising a control mechanism that automatically operates the components of said apparatus, said control mechanism including a bypass switch that disengages all operations of the components of said apparatus except the operation of the conveyors to enable manual formation of stacks of egg trays.

\* \* \* \* \*